(12) United States Patent
Wirtz et al.

(10) Patent No.: US 11,767,490 B2
(45) Date of Patent: Sep. 26, 2023

(54) APPARATUS AND METHOD FOR EXTRACTING OIL FROM PLANT MATERIAL

(71) Applicant: MACH Technologies, Detroit, MI (US)

(72) Inventors: Robert N. Wirtz, Royal Oak, MI (US); Jason T. Wirtz, Royal Oak, MI (US); John W. Wirtz, II, Fort Gratiot, MI (US)

(73) Assignee: MACH Technologies, Detroit, MI (US)

( * ) Notice: Subject to any disclaimer, the term of this patent is extended or adjusted under 35 U.S.C. 154(b) by 282 days.

(21) Appl. No.: 17/187,009

(22) Filed: Feb. 26, 2021

(65) Prior Publication Data

US 2021/0268401 A1 Sep. 2, 2021

Related U.S. Application Data

(60) Provisional application No. 63/006,343, filed on Apr. 7, 2020, provisional application No. 62/982,188, filed on Feb. 27, 2020, provisional application No. 62/982,180, filed on Feb. 27, 2020.

(51) Int. Cl.
*C11B 1/10* (2006.01)
*B01D 11/02* (2006.01)

(52) U.S. Cl.
CPC ............ *C11B 1/10* (2013.01); *B01D 11/0207* (2013.01); *B01D 11/0215* (2013.01); *B01D 11/0288* (2013.01); *B01D 11/0296* (2013.01)

(58) Field of Classification Search
CPC ..... B01D 11/00; B01D 11/02; B01D 11/0207; B01D 11/0215; B01D 11/0269; B01D 11/0273; B01D 11/028; B01D 11/0288; B01D 11/0292; B01D 11/0296; C11B 1/00; C11B 1/10; C11B 3/00; C11B 3/006
See application file for complete search history.

(56) References Cited

U.S. PATENT DOCUMENTS

| 4,196,231 A | * | 4/1980 | Hubers | ..................... B05C 3/04 |
| | | | | 427/430.1 |
| 4,483,458 A | | 11/1984 | Minning et al. | |
| 9,327,210 B1 | | 5/2016 | Jones | |

(Continued)

OTHER PUBLICATIONS

International Preliminary Report on Patentability for International Application No. PCT/US2021/019913 dated Aug. 30, 2022 (14 pages).

*Primary Examiner* — Natasha E Young
(74) *Attorney, Agent, or Firm* — Reising Ethington P.C.

(57) ABSTRACT

A process and apparatus for extracting plant oil from plant material by cooling an alcohol solvent to a temperature of −40° C. or lower, contacting the plant material with the cold solvent to extract plant oil to provide a solvent and plant oil mixture, heating the mixture to convert the solvent to a gaseous state to thereby separate the solvent from the plant oil, and cooling the separated gaseous solvent to a liquid to recover the solvent. The apparatus may include a heat exchanger to cool the alcohol solvent, a centrifuge configured to receive and contact a batch of plant material with the cold solvent to extract oil from the plant material to provide a solvent and oil mixture, and a programmable logic controller to monitor and control the temperature of the cold solvent, and control the centrifuge to agitate the solvent in contact with the plant material.

24 Claims, 11 Drawing Sheets

(56) References Cited

U.S. PATENT DOCUMENTS

| | | |
|---|---|---|
| 9,399,180 B2 | 7/2016 | Ellis et al. |
| 9,669,328 B2 | 6/2017 | Jones |
| 9,687,754 B2 | 6/2017 | Ellis |
| 2011/0035996 A1 | 2/2011 | Herndon |
| 2011/0122120 A1 | 5/2011 | Feuilloley |
| 2011/0133120 A1 | 6/2011 | McGhee |
| 2014/0369893 A1 | 12/2014 | Ellis et al. |
| 2016/0303490 A1 | 10/2016 | Ellis |
| 2016/0346339 A1 | 12/2016 | Finley et al. |
| 2018/0099017 A1 | 4/2018 | Jones |
| 2019/0046998 A1 | 2/2019 | Stephens et al. |
| 2019/0121771 A1 | 4/2019 | Kadgi |
| 2019/0143246 A1* | 5/2019 | Ko .................. B01D 15/00 422/270 |
| 2019/0151771 A1 | 5/2019 | Thomas |
| 2019/0185783 A1* | 6/2019 | Neil ................ B01D 11/0257 |
| 2019/0241536 A1 | 8/2019 | Durkacz et al. |
| 2020/0017889 A1 | 1/2020 | Poulos et al. |

* cited by examiner

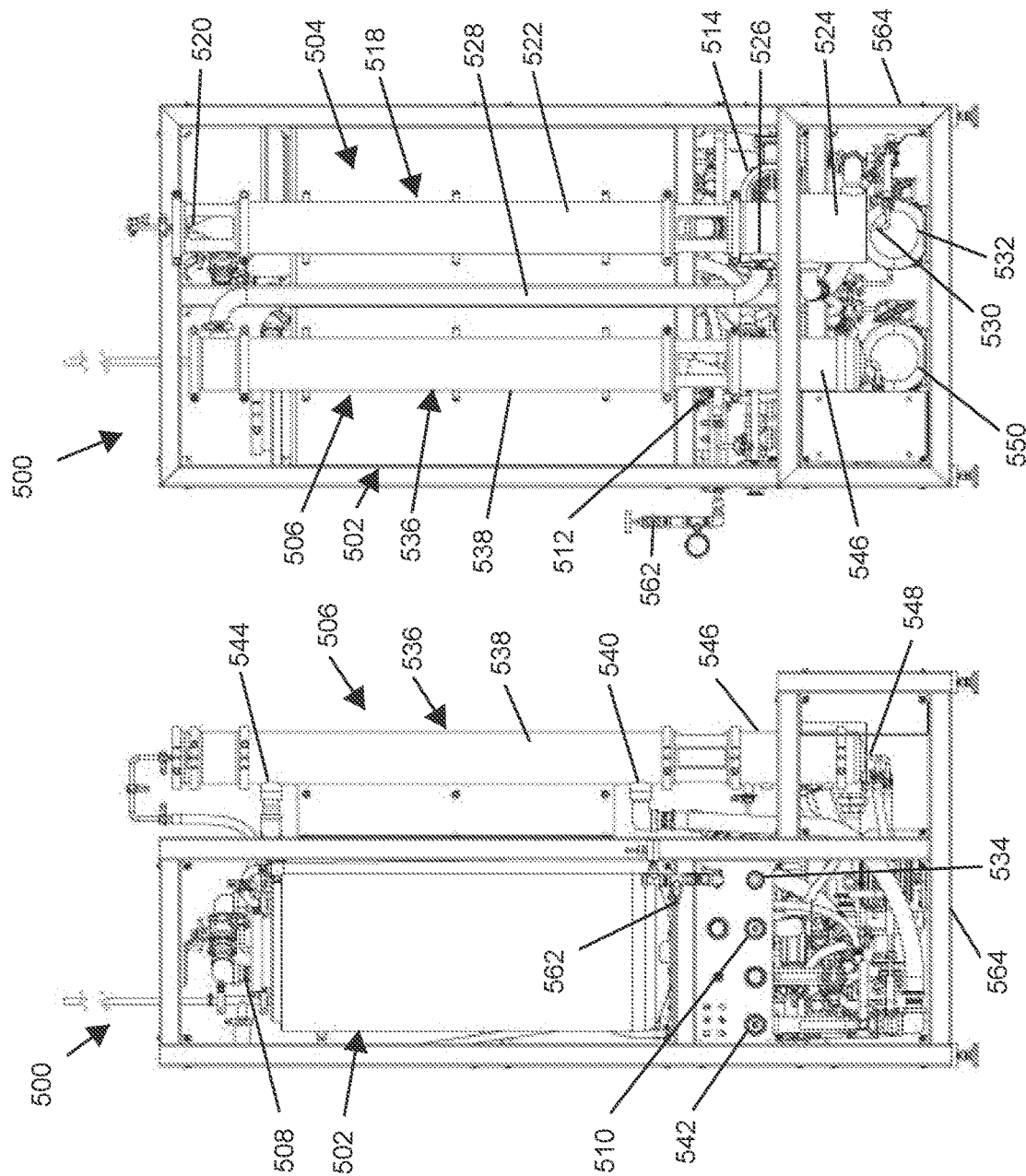

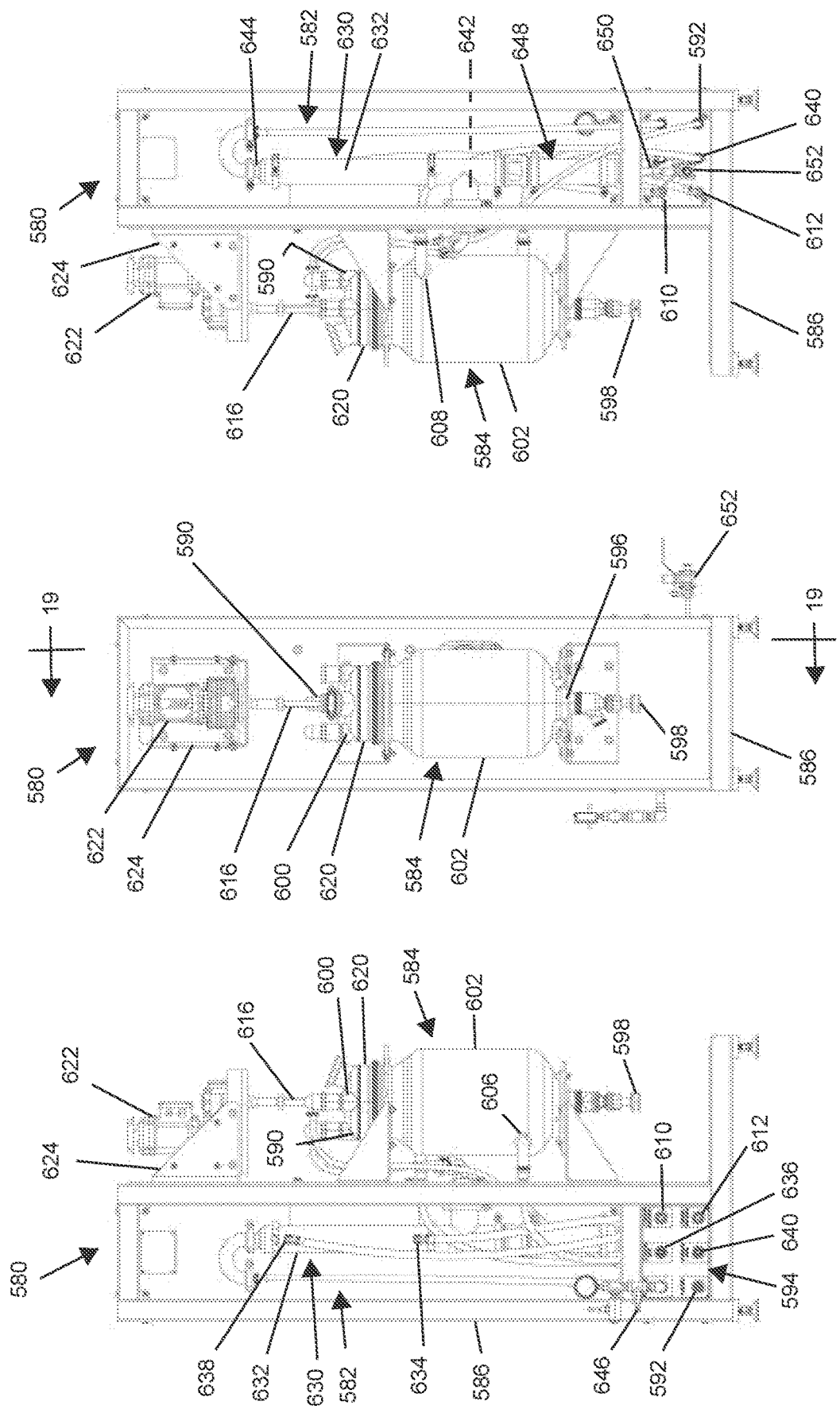

APPARATUS AND METHOD FOR EXTRACTING OIL FROM PLANT MATERIAL

PRIORITY

This patent application claims the priority of U.S. provisional patent applications 62/982,180 filed Feb. 27, 2020, 62/982,188 filed Feb. 27, 2020 and 63/006,343 filed Apr. 7, 2020 the disclosure in its entirety of each of which is incorporated herein by reference.

TECHNICAL FIELD

This invention relates to extracting oil from oil bearing plant material and, more particularly, to an apparatus and method for extracting such oil using a volatile liquid solvent.

BACKGROUND

Various methods and a variety of manually operable apparatus have been developed for extracting plant oil from oil bearing plant material. Some methods and apparatus for doing so are disclosed in U.S. Pat. Nos. 9,687,754; 9,699,328; 9,399,180; and 9,327,210. Typically, these methods and apparatus use a flammable, usually hydrocarbon-based solvent such as propane, butane and mixtures thereof. Usually, after separation of the solvent from the plant oil, the plant oil requires further processing to remove undesirable constituents such as chlorophyll, waxes, and carboxylates which the solvent also removed from the plant material. Usually, an operator needs be present to manually operate and cycle the apparatus to carry out a process of extracting plant oil from oil bearing plant material.

Therefore, it would be desirable to have a method and an automated apparatus a for extracting plant oil from oil bearing plant material which does not also extract chlorophyll, waxes, and carboxylates from the plant material. Desirably, the automated apparatus would not require an operator to be present during the extraction process or to monitor and operate the extraction apparatus.

SUMMARY

In at least some implementations a plant oil extraction process may include cooling an alcohol solvent to provide a cold solvent at a temperature of −40° C. or lower; contacting plant material containing plant oil with the cold solvent to extract plant oil to provide a solvent and plant oil mixture; heating this mixture to convert the solvent to a gaseous state to thereby separate the solvent from the plant oil; and cooling the separated gaseous solvent to a liquid to recover the solvent. In some processes the collected solvent and plant oil mixture may be contacted with another fresh batch of plant material to thereby increase the concentration of extracted oil in the mixture. In some processes the plant oil and solvent mixture may be passed through at least one and desirably a series of filters to filter out any solid particulate matter and, if desired, to provide color remediation of the oil prior to oil and solvent separation.

In at least some implementations an electronic controller such as a programmable logic controller may monitor and control the temperature of the cold solvent produced by the heat exchanger, control the centrifuge to agitate the solvent in contact with the plant material for a period of time and to rotate for a period of time to separate the mixture from the plant material. In at least some implementations a quantity of solvent may be supplied from a holding tank to the heat exchanger by a pump which may be controlled by the programmable logic controller. In at least some implementations solvent in a remote solvent storage tank having a maximum capacity greater than that of the holding tank may be supplied by a pump to the holding tank. In at least some implementations a solvent level sensor may provide a signal of the level of solvent in the holding tank to the programmable logic controller to control operation of the pump to supply solvent to the holding tank. In at least some implementations a cold storage vessel may receive cold solvent from the heat exchanger and to maintain the cold solvent therein at a temperature of −40° C. or lower. In at least implementations a temperature sensor may provide a signal to the programmable logic controller which is used at least in part by it to maintain the cold solvent therein at a temperature not greater than minus 40° C. In at least some implementations a pump may supply cold liquid solvent from the cold storage vessel to the centrifuge and operation of the pump may be controlled by the programmable logic controller. In at least some implementations a solvent level sensor may provide a signal to the programmable logic controller which may at least in part be used by it to control operation of the pump supplying cold liquid solvent to the centrifuge.

In at least some implementations a recirculation vessel may receive from the centrifuge an oil and solvent mixture removed from a first batch of plant material and return this oil and solvent mixture to the centrifuge for removing oil from a new second batch of plant material. In some implementations a flow control valve controlled by the programmable logic controller may control flow of the solvent and oil mixture from the recirculation vessel into the centrifuge. In at least some implementations at least one filter may filter the oil and solvent mixture from the recirculation vessel.

In at least some implementations a mechanism may automatically open and close a cover of the centrifuge and clamp and unclamp the closed cover. In some implementations the mechanism may be controlled by the programmable logic controller.

In at least some implementations the solvent may be recovered from the solvent and plant oil mixture by heating the mixture in a vacuum typically of about 5 to 28 inches of mercury to vaporize or evaporate the solvent and separate it from the plant oil, and condensing the vaporized solvent to a liquid which then may be reused. In at least some implementations the separated plant oil may be decarboxylated by heating the plant oil in a vacuum typically of about 10 to 29 inches of mercury to an elevated temperature typically in the range of 100-150 degrees C. (210-300 degrees F.) for a period of time typically of about 30 to 240 minutes.

BRIEF DESCRIPTION OF THE DRAWINGS

The following detailed description of certain embodiments and best mode will be set forth with reference to the accompanying drawings in which:

FIG. 13 is a front view of a solvent recovery apparatus with its outer cover panels removed to illustrate components thereof;

FIG. 14 is a left-hand side view of the solvent recovery apparatus of FIG. 13 with its outer cover panels removed;

FIG. 16 is a front view of a plant oil decarboxylation apparatus with its outer cover panels removed to illustrate components thereof:

FIG. 17 is a left-hand side view of the decarboxylation apparatus of FIG. 16 with its outer cover panels removed;

FIG. 18 is a right-hand side view of the decarboxylation apparatus of FIG. 16 with its outer cover panels removed.

DETAILED DESCRIPTION OF PREFERRED EMBODIMENTS

Figure 1:
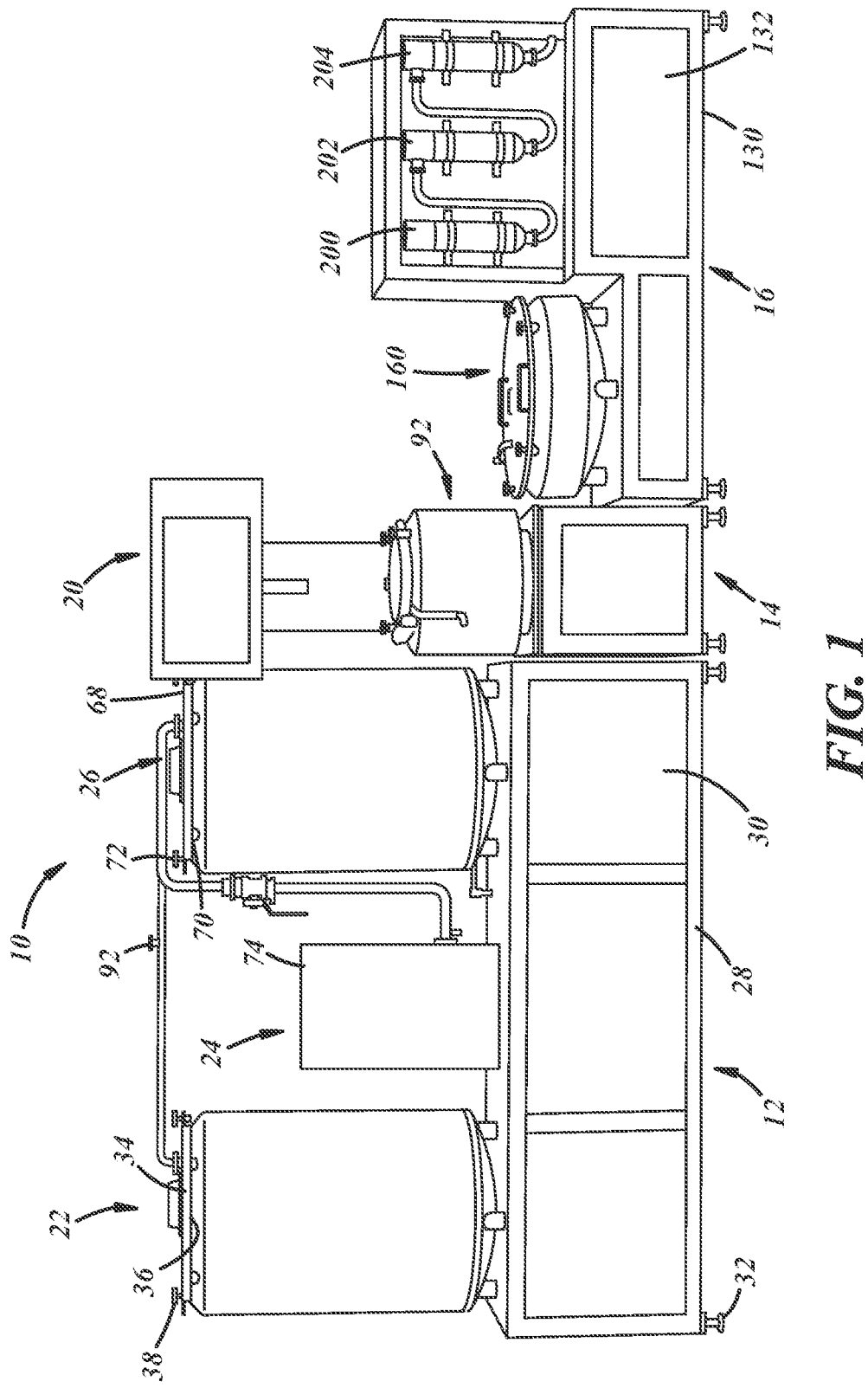
FIG. 1 is a perspective front view of an extraction apparatus.
Figure 3:
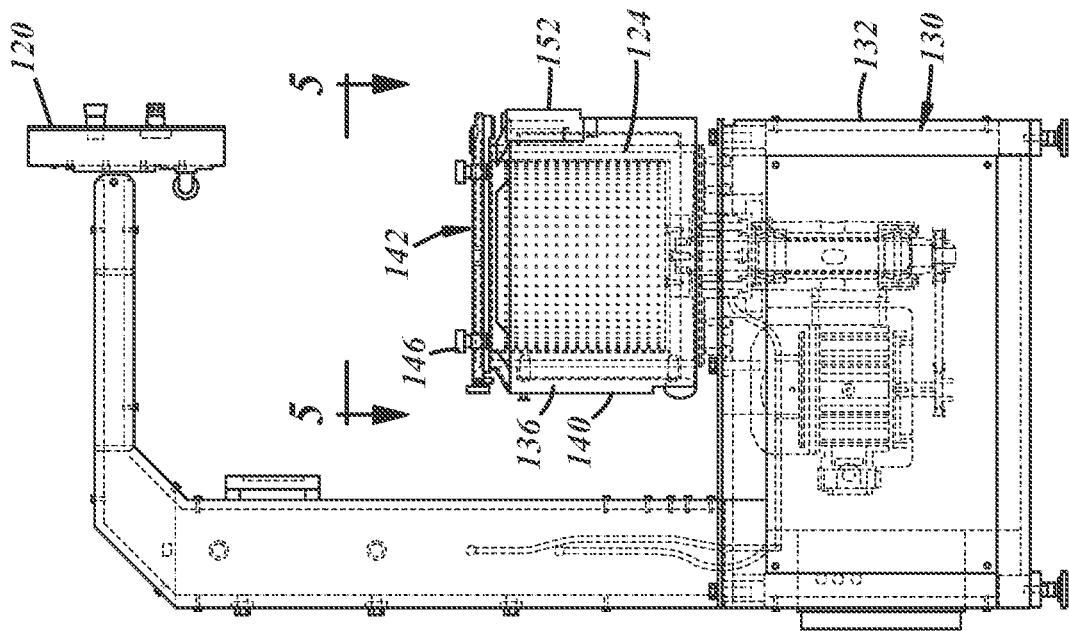
FIG. 3 is a side view partially in section of an extraction and drying module of the apparatus.

Referring in more detail to the drawings, FIG. 1 illustrates a modular extraction apparatus 10 or system for removing and recovering plant oil from oil bearing plant material which plant oil may be used for various purposes and products depending on the variety of plant material from which it was extracted such as, including without limitation, perfumes, cosmetics, pharmaceuticals, health care, and, more recently, various medical and recreational *cannabis*-based products. In general, this apparatus may perform one or more extraction process which may include, without limitation, cooling a liquid ethanol or isopropyl solvent (hereinafter "alcohol solvent" or "solvent") to a temperature equal to or lower than −40° C., contacting a batch of plant material with the cold liquid solvent to remove plant oil from the plant material, collecting the cold solvent and plant oil, drying the plant material, desirably contacting the collected solvent and plant oil mixture with another batch of plant material to thereby increase the concentration of extracted oil in the mixture, and passing the plant oil and solvent mixture through at least one and, preferably a series of filters to filter out any solid particulate matter and, if desired, to provide color remediation of the oil prior to oil separation and solvent recovery. The solvent may be separated from the extracted oil such as by heating to vaporize the solvent and thereafter the vapor may be cooled to condense the solvent into a liquid form from which any water may be extracted such as by another filter and the liquid solvent returned to a holding vessel for reuse in the process by the apparatus.

By cooling and maintaining the solvent throughout the process prior at least to filtration at a temperature of −40° C. or lower the extracted oil may not contain any significant quantity of chlorophyll, waxes, and/or carboxylates thus eliminating the need for so called "winterizing" the extracted oil which is a relatively expensive and time-consuming step required in at least most other extraction processes to produce a commercially viable plant oil.

As shown in FIG. 1, the apparatus or system 10 may be modular and may include an alcohol solvent chilling module 12, a plant oil extraction and material drying module 14, and a recirculation vessel and filtration module 16. Operation and cycling of the modules is monitored and controlled by an electronic controller such as a Programmable Logic Controller (PLC) 18 and at least some of the steps carried out by the system can be programmed by an operator using a touch screen Human Machine Interface (HMI) 20 communicating with the PLC.

The chilling module 12 may include a liquid alcohol (preferably ethanol) solvent holding vessel or tank 22, a heat exchanger 24 for cooling or chilling the liquid alcohol solvent to a temperature of −40° C. or lower and a cold solvent storage vessel 26. They may be received in and carried by a base frame 28 which may include removable access enclosure panels 30 and adjustable feet 32 to facilitate leveling of the module. The alcohol solvent holding vessel or tank 22' may be made of a non-corrosive and sanitary material such as stainless steel and may have a removable access cover 34 attached to a flange 36 encircling an opening in the top of the tank by a plurality of circumferentially spaced apart threaded fasteners 38 or clamps attached to the flange. This holding tank 22 may have an inlet adjacent its top which may be connected preferably through a compressed air or electrically operated pump 39 to a remote large solvent storage tank (not shown) to supply solvent to the holding tank. The holding tank 22 may include a liquid level sensor 40 and a temperature sensor 42 providing inputs to the PLC 18 which may control operation of this pump 39 to maintain a desired level of alcohol solvent in the holding tank 22. In most applications, the holding tank 22 and liquid solvent may be at room temperature and thus the holding tank may have a single wall.

Figure 2:
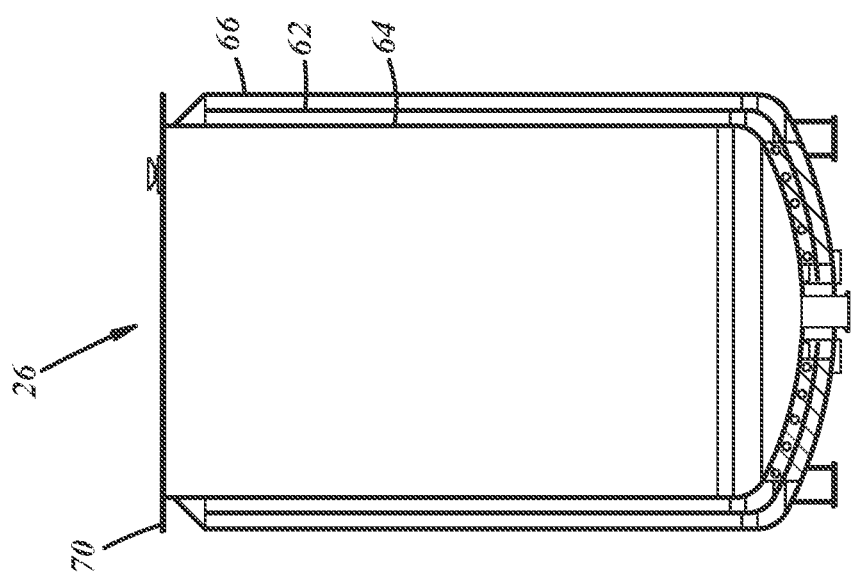
FIG. 2 is a somewhat schematic fragmentary sectional view of a vessel for chilled solvent of the apparatus of FIG. 1.
Figure 5:
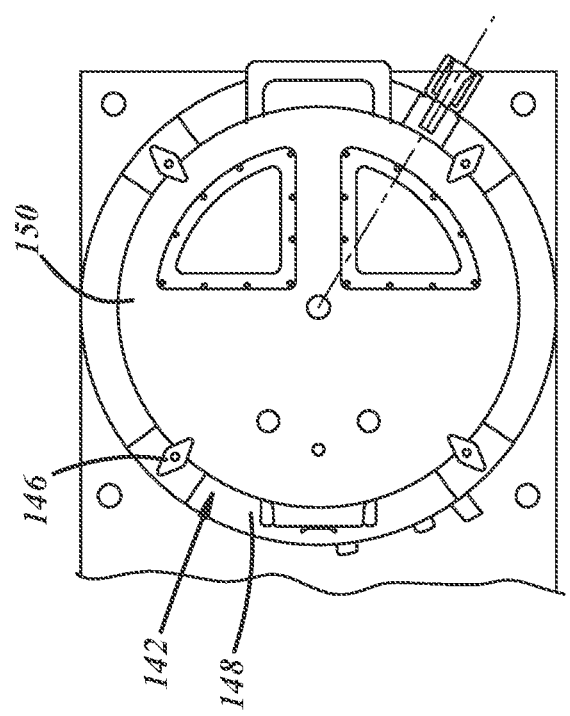
FIG. 5 is a top view of a cover of the centrifuge with a portion broken away.
Figure 7:
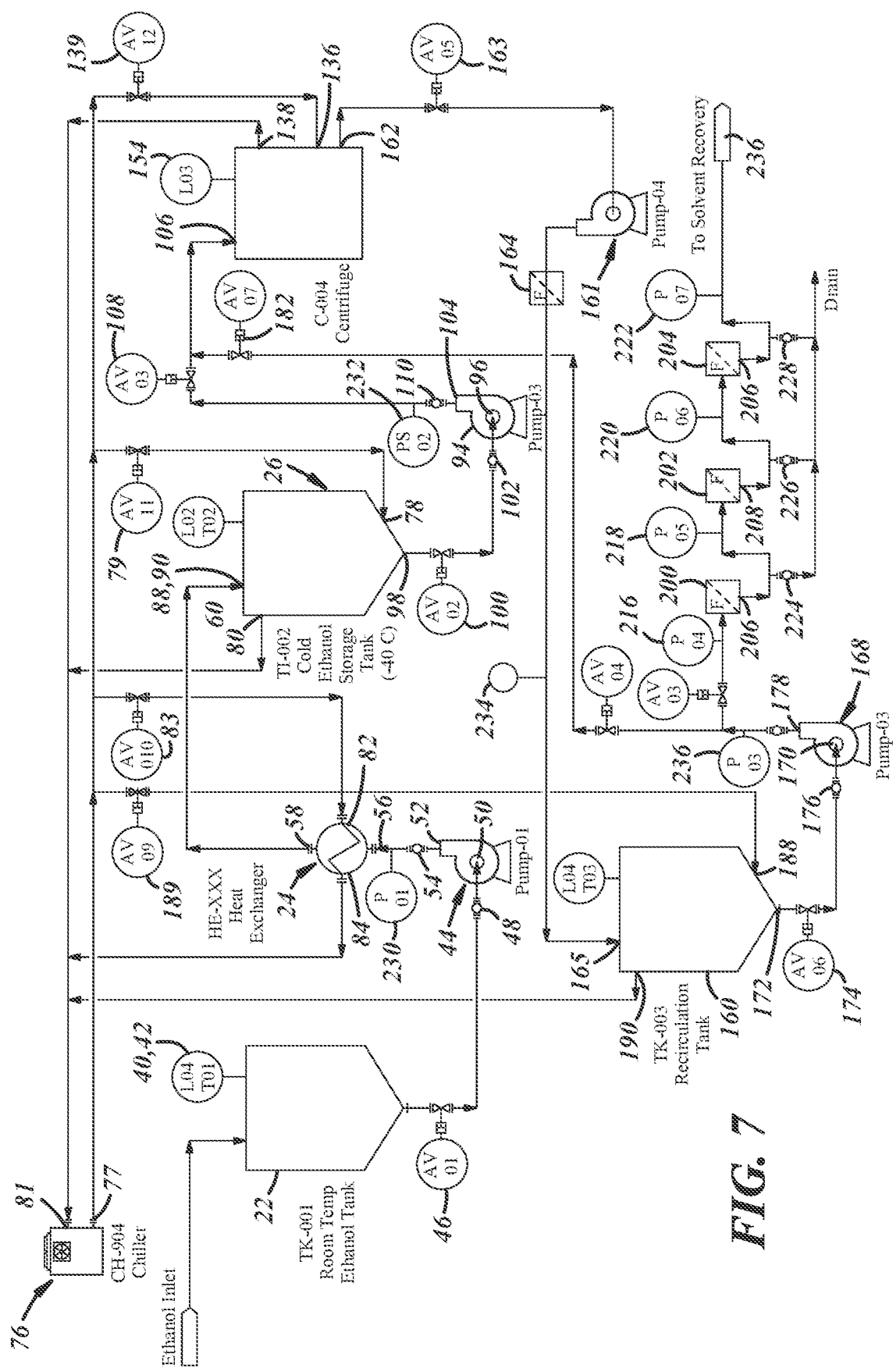
FIG. 7 is a fluid flow schematic of the apparatus of FIG. 1.

Liquid alcohol solvent from the holding tank 22 is cooled or chilled by a heat exchanger 24 and supplied to the cold alcohol solvent storage vessel 26. As shown in FIG. 7, liquid alcohol solvent 24 is supplied from the bottom of the holding tank 22 to and through the heat exchanger 24 by a suitable pump 44 connected by pipes or conduits and through an air or electric solenoid actuated flow control valve 46 (and desirably a manual normally open shut off valve 48) to the inlet 50 of the pump and from an outlet 52 of the pump (and desirably through a normally open manual shut off valve 54) to a solvent inlet 56 of the heat exchanger and from a solvent outlet 58 through suitable pipes or conduits to an inlet 60 adjacent the top of the cold solvent storage vessel 26. The manual shut off valves 48,54 may facilitate service, maintenance and/or replacement of the pump. As shown somewhat schematically in FIG. 2, a cooling jacket 62 surrounds the bottom and side wall 64 of the cold storage vessel 26. The cooling jacket is surrounded by a thermal insulating evacuated vacuum jacket 66. The insulating vacuum jacket also keeps the outside of the storage vessel at a reasonable temperature to prevent condensation on it of water vapor from the surrounding atmosphere and inhibit injury of an operator or other person whose skin comes in contact with this vessel. This vessel may have a cover 58 removably attached to flanges 70 encircling an opening in the top of the vessel by a plurality of circumferentially spaced apart threaded fasteners or clamps 72 carried by the flange. A seal may be received between the cover and the flange. An insulating evacuated vacuum jacket or enclosure 74 may also surround the heat exchanger.

As shown in FIG. 7, a cooling fluid such as cold air or liquid Dynalene may be supplied by a chiller unit 76 from its outlet 77 through pipes or conduits (desirably insulated) with a flow control valve 79 to an inlet 78 of the cooling jacket 26, and from an outlet 80 of the cooling jacket through suitable desirably insulated pipes or conduits to the return inlet 81 of the chiller unit 76. Cooling fluid is supplied to the inlet 82 of the heat exchanger 24 through suitable pipes or conduits desirably insulated with a flow control valve 83, and returned through a fluid outlet 84 of the heat exchanger to the return inlet 81 of the chiller unit. In operation, the chiller unit maintains the cold solvent in the cold solvent storage vessel 26 at a temperature of −40° C. or lower, desirably −45° C., preferably −50° C., and maintains the heat exchanger 24 cool enough to do so.

Desirably, the pump 44 has a compressed air or an electric motor variable speed drive to vary the flow rate of liquid solvent supplied to the heat exchanger 24 and the cold solvent storage vessel 26 which may have a liquid level sensor 88 and a temperature sensor 90 communicating with the PLC 18 to vary the speed and thus the flow rate of the liquid solvent supplied to them by the pump when the apparatus is in use. The PLC 18 may also use the temperature signal from this sensor 90 and the coolant control valves 83, 79 to control the temperature of the cooling fluid supplied to them by the chiller unit 76. The level sensor 88 in communication with the PLC 18 ensures that this vessel 26 is not overfilled with cold alcohol solvent. As shown in FIG. 1, a pressure relief valve 91 may be connected by a suitable conduit to both this cold solvent storage vessel 26 and the warm solvent holding tank 22. The relief valve may be set to open at a pressure typically in the range of 10 to 20 psig.

The Dynalene liquid coolant is commercially available from Dynalene, Inc., 5250 West Coplay Road, Whitehall, Pa. 18052, as Dynalene HC-FG. Typically, the chiller unit 76 may have a capacity at −40° C. in a range of about 6 to 50 kilowatt hours and is commercially available from various manufacturers such as Fluid Chillers, Inc., 3005 Alpha Access Street, Lansing, Mich. 48910. Suitable heat exchangers are commercially available from various manufacturers such as Thermaline, Inc., 1531 14th Street NW, Auburn, Wash. 98001.

Cold alcohol solvent may be supplied from the cold storage vessel 26 to a centrifuge 92 of the extraction and drying module 14 by a pump 94 driven by a variable speed compressed air or electrical motor drive which may be controlled by the PLC 18 to vary the quantity of and rate at which cold solvent is delivered to the centrifuge 92. As shown in FIG. 7, an inlet 96 of the pump may be connected to an outlet 98 adjacent the bottom of the cold storage vessel 26 through a suitable pipe or conduit which is desirably insulated and may include an air or electric solenoid actuated flow control valve 100 and a downstream normally open manual shut off valve 102. An outlet 104 of the pump may be connected to an inlet 106 of the centrifuge 92 by suitable pipes or conduits desirably insulated and with an air or electric solenoid actuated flow control valve 108 and desirably an upstream normally open manual shut off valve 110.

Figure 4:
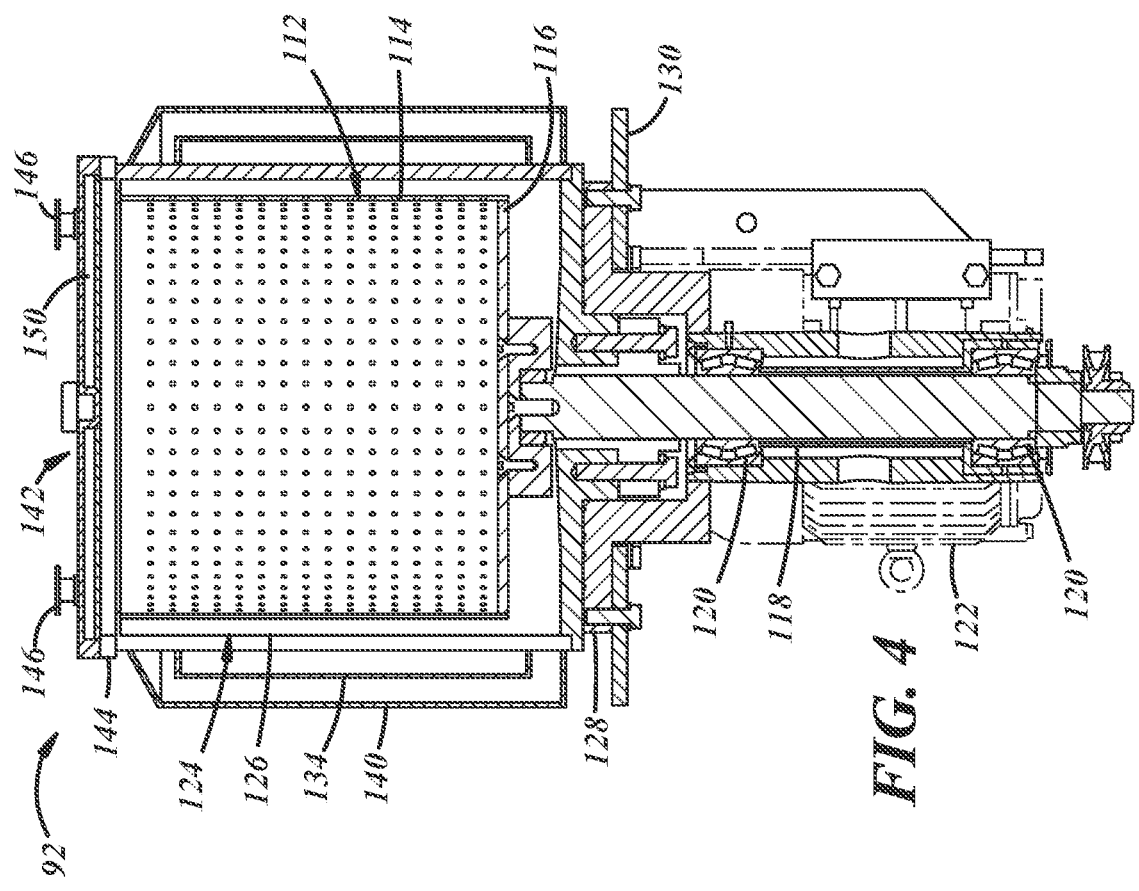
FIG. 4 is an enlarged sectional view of a centrifuge of the extraction and drying module of FIG. 3.

As shown in FIG. 4, the centrifuge may include a basket 112 in which plant material is received. The basket may have a perforated cylindrical side wall 114 fixed to a bottom wall 116 attached to a drive shaft 118 journaled for rotation in bearings 120 and driven by an electric motor 122 which may be a reversible stepper motor which may be controlled by the PLC 18 to both agitate cold solvent in the basket desirably by back-and-forth rotation of the basket, and control the speed at which the basket may be rotated in one direction for multiple revolutions to remove the solvent and plant oil mixture from the batch of plant material received in the basket. The basket 112 is received in a vessel or container 124 with a circumferentially continuous side wall 126 fixed to a bottom wall 128 carried by a base frame 130 with a removable access panel 132. A cooling jacket 134 may encircle the side wall 126 of the container 124 and, as shown in FIG. 7, may have a cooling fluid inlet 136 desirably adjacent the bottom of the cooling jacket and a cooling fluid outlet 138 adjacent a top of the cooling jacket. Through suitable pipes or conduits, which may be insulated, and a flow control valve 139 the inlet 136 communicates with the outlet of the chiller unit 76 to maintain the cold solvent in the container at a temperature of −40° C. or lower during operation of the apparatus. The cooling jacket outlet 138 may communicate through suitable pipes or conduits, desirably insulated, with the inlet 81 of the chiller 76. The cooling jacket 134 of the centrifuge may be thermally insulated by an evacuated and sealed vacuum jacket 140.

To permit an operator to load into and remove from the basket 112 batches of plant material, the upper end of the container 124 may be opened and closed and sealed by a cover 142 which may be releasably secured to a flange 144 with a seal between them by a plurality of circumferentially spaced apart threaded fasteners or clamps 146 pivotally connected to the flange. The cover may be connected to the container by a hinge 148. The cover may have an internal insulating evacuated and sealed vacuum cavity or jacket 150 which may both improve cooling efficiency and maintain the exterior surface of the cover at a reasonable temperature to prevent condensation of atmospheric moisture on it and inhibit injury of an operator or other person whose skin comes in contact with the cover.

Desirably, an electric solenoid or compressed air actuated latch mechanism 152 (normally locked) may be operably associated with the cover 142 and attached to the exterior of the vacuum jacket 140 to prevent operation of the centrifuge drive motor 122 if the cover 142 is not fully closed and secured by the fasteners or clamps 146 to the container 124 and to prevent the cover from being opened during operation of the centrifuge 92. This latch 152 is desirably hard wired so that it cannot be bypassed or over ridden by the PLC. A speed or rotary sensor may be associated with the centrifuge basket 112, drive shaft 118, or its electric drive motor 122 which when it detects rotation also prevents the latch mechanism 152 from releasing the cover 142 so that it cannot be opened. Desirably an over pressure relief valve communicates with the container to prevent it from being excessively pressurized and may be set to provide pressure relief at a suitable pressure such as 10 to 20 psig. The centrifuge may also have a vibration monitor and an amperage monitor of its drive motor 122 which communicate with the PLC to shut down the centrifuge 92 before it is damaged by excessive vibration and/or excessive current load of the drive motor. To control filling of the centrifuge with cold solvent and to avoid overfilling it, a solvent level sensor 154 provides a signal to the PLC 18 which controls the fill valve 108.

In operation, a batch of plant material (which may be in a permeable bag) is placed in the basket of the centrifuge 92 and its cover 142 is closed and secured in place. Then cold solvent is supplied into the centrifuge container 124 and the basket is agitated desirably with a back-and-forth motion for a few minutes (typically 10 to 15 minutes) to speed up removal of oil by the solvent from the plant material and then the solvent and oil mixture is transferred from the container to a recirculation holding vessel 160. To remove essentially all of the mixture from the plant material (dry it) the basket 112 is rotated at a relatively high speed with a relative centrifugal force (RCF) typically in the range of about 200 to 1,200 g's of gravity force.

In order to increase the quantity or concentration in the solvent of extracted plant oil, after oil has been extracted from a first batch of plant material it may be removed from the centrifuge 92 and a second batch of new plant material placed in the centrifuge and then the oil and solvent mixture from the first batch returned to the centrifuge for extracting oil from the second batch of plant material. Thereafter, the solvent with oil from both the first and second batches of material may be removed from the centrifuge and filtered. To do so, as shown in FIG. 7 an outlet 162 at the bottom of the container 124 of the centrifuge 92 is connected via a pipe or a conduit (which is desirably insulated) and a flow control valve 163 with an inlet of a pump 161 with its outlet connected by suitable pipes or conduits and optimally through a filter 164 with an inlet 165 of the recirculation holding vessel 160. After the first batch of material is removed from and the second batch of material is placed in the centrifuge basket 112 and its cover 142 is secured in place, the extracted solvent and oil mixture from the first batch may be returned to the centrifuge container 124 by a pump 168 with an inlet 170 connected to an outlet 172 at the bottom of the recirculation holding vessel 160 by a pipe or conduit through a compressed air or electric solenoid actuated shut off valve 174 and desirably a downstream normally open manual shut off valve 176. And with an outlet 178 of the pump connected by a pipe or conduit (desirably insulated) with a downstream first compressed air or electric solenoid actuated shut off valve 180 in series with a second compressed air or electric solenoid actuated shut off valve 182 connected to the inlet 106 of the centrifuge container 124. Each of the valves 163, 174, 180 and 182 may be controlled by the PLC 18.

Figure 6:
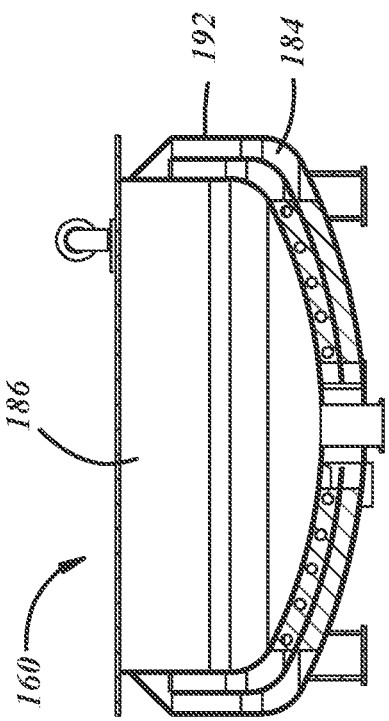
FIG. 6 is a sectional view of a recirculation vessel of the apparatus of FIG. 1.

As shown in FIGS. 6 and 7, the recirculation vessel 160 may include a cooling jacket 184 desirably circumferentially encircling a side and bottom wall 186 of the vessel with an inlet 188 desirably adjacent to the bottom communicating through a flow control valve 189 with the outlet 77 of the chiller unit 76 and an outlet 190 adjacent the top of the cooling jacket communicating with the inlet of the chiller unit 76 through suitable conduits or ducts that are desirably insulated. This vessel may also have an evacuated vacuum jacket 192 encircling the cooling jacket to provide thermal insulation of the recirculation holding vessel. The vacuum jacket also inhibits condensation of moisture thereon from the atmosphere and inhibits injury of an operator or any person whose skin comes in contact with the side wall of this vessel. As shown in FIG. 7, the recirculation vessel may also have a liquid level sensor 194 and a temperature sensor 196 providing signals to the PLC 18 which may be used to control cycling of the pump 168. The signal from the temperature sensor 196 may be used at least in part by the PLC to control and maintain the temperature of the solvent and oil mixture in the recirculation vessel 160 at a temperature of −40° C. or lower. The PLC may also track the first and second cycles of cold solvent through the centrifuge and after the second cycle is complete and the solvent and oil mixture is transferred to the recirculation vessel 160, the PLC may cycle the pump and the flow control valves 174, 180 and 198 to supply the twice cycled solvent and oil mixture to and through one or more filters of the recirculation and filter module 16. To permit cold solvent in the pipes or conduits connecting the valves 180 and 182 to back flow to the pump 168 to keep it primed while the valve 182 is closed the valve 180 may be opened.

As shown in FIG. 1, to remove any particles of plant material and any residual waxes and chlorophyll, and, if desired, to change the color of the oil in the mixture, the mixture may be passed through three filters 200, 202 and 204 connected in series with the outlet 206 of the first filter 200 connected with the inlet 208 of the second filter 202 and its outlet 210 connected with the inlet 212 of the third filter 204. If desired, each filter housing may have a filter cartridge with micro porosity which typically may be in the range of 60 to 1 microns and of a material such as needle felt or activated carbon. The pump 168 may be used to supply the extracted oil and solvent mixture to the inlet of the first filter 200 and to discharge the filtered mixture from the outlet 214 of the third filter 204. The PLC 18 may open the recirculation vessel outlet valve 174, close the pump outlet valve 180, open a filter inlet valve 198, and actuate the pump 168 to supply the unfiltered mixture to and through the filters. Pressure responsive sensors 216, 218 and 220 at the inlet of each filter and a pressure sensor 222 at the outlet of the third filter 204 may provide signals to the PLC which may be used to monitor the filtration process and to control the flow rate through the filters produced by the pump 168 by varying the speed of its compressed air or electric drive motor. For the purpose of flushing and/or draining the filters, an outlet of each filter may also be connected to a manual normally closed drain valve 224', 226 and 228. The outlet side of each of the pumps may have a pressure sensor 230, 232, 234 and 236 each providing a pressure signal to the PLC 18 which may be used to monitor and control the operation of the pumps and/or the pressure of the solvent produced by each pump. The PLC may also use these pressure signals to shut down operation of the apparatus 10 in the event of excessive high or low pressure at the outlet of a pump.

The filtered solvent and extracted oil mixture may be supplied to an oil separation and solvent recovery apparatus 230 which typically heats the mixture to evaporate the alcohol solvent, thereby separating it from the extracted oil, and then condenses it to a liquid form which if desired may be returned to the solvent holding tank 222 or to a remote large storage tank for reuse.

Figure 8:
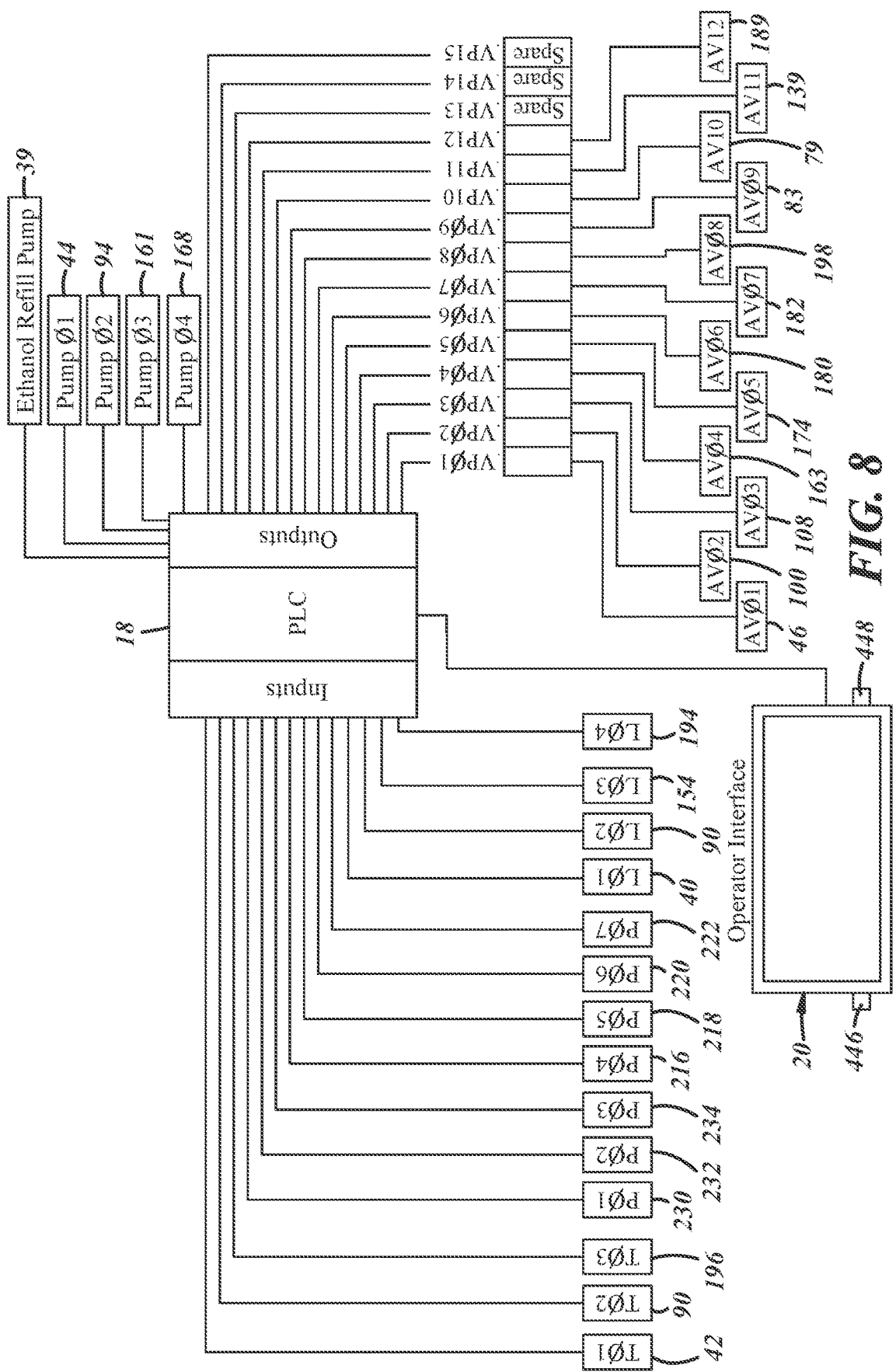
FIG. 8 is a sensor and control schematic of the apparatus of FIG. 1.

As shown in FIG. 8, each of the temperature sensors, pressure sensors, and liquid level sensors may provide an input to the PLC. With appropriate software, the PLC may use one or more of these inputs to control the electric motor driving each of the pumps and one or more of the solenoid actuated valves to automatically cycle the apparatus to carry out a plant oil extraction and oil and solvent recovery process.

For sanitary purposes, each of the vessels, heat exchanger, centrifuge, filter housings, and connecting pipes or conduits may be made of a sanitary grade of stainless steel. Suitable liquid level sensors and temperature sensors are available from Automation Products Group, Inc., 1025 W. 1700 N, Logan, Utah 84321, such as its MPX Series of sensors. Suitable pressure sensors are available from Omega, Inc., 800 Connecticut Ave., Norwalk, Conn. 06854, such as its PX835 Series of pressure sensors.

By use of the HMI touch screen, an operator of the apparatus may enter data and parameters for various aspects of operation of the apparatus such as, without limitation, the quantity of cold solvent to be supplied to the centrifuge after each batch of new plant material is placed in the centrifuge basket, the period of time during which the batch of material will be in contact with the cold solvent, the period of time and rate of agitation by the centrifuge, the period of time and speed of the centrifuge spinning to dry or remove the solvent and oil mixture from the plant material in the centrifuge, the flow rate of the solvent and oil mixture through the filters, etc. The touch screen may also be used by the operator to see the status of operation of the apparatus and, if programmed, to view support videos providing information on how to enter data for operation of the apparatus and how to check out or observe the status of the operating system, etc. With the PLC, the apparatus may be sufficiently automated so that the only function of the operator is to enter the desired data for carrying out the specific process or recipe, remove each batch of processed plant material from the centrifuge, load a batch of new plant material into the centrifuge, secure its cover, and start the operation of the apparatus. Typically, a batch of new plant material may be processed by the apparatus every 10 to 30 minutes depending upon the particular process and cycle times entered by the operator using the HMI touch screen.

The HMI touch screen may be mounted on an arm of the centrifuge module. Suitable PLC controllers and HMI devices are commercially available such as the Allen-Bradley L33 PLC and an HMI such as the Hope Industrial 23-inch universal mount and touch screen from Hope Industrial Systems, Inc. of 1325 North Meadow Parkway, #100, Roswell, Ga. 30076.

Figure 9:
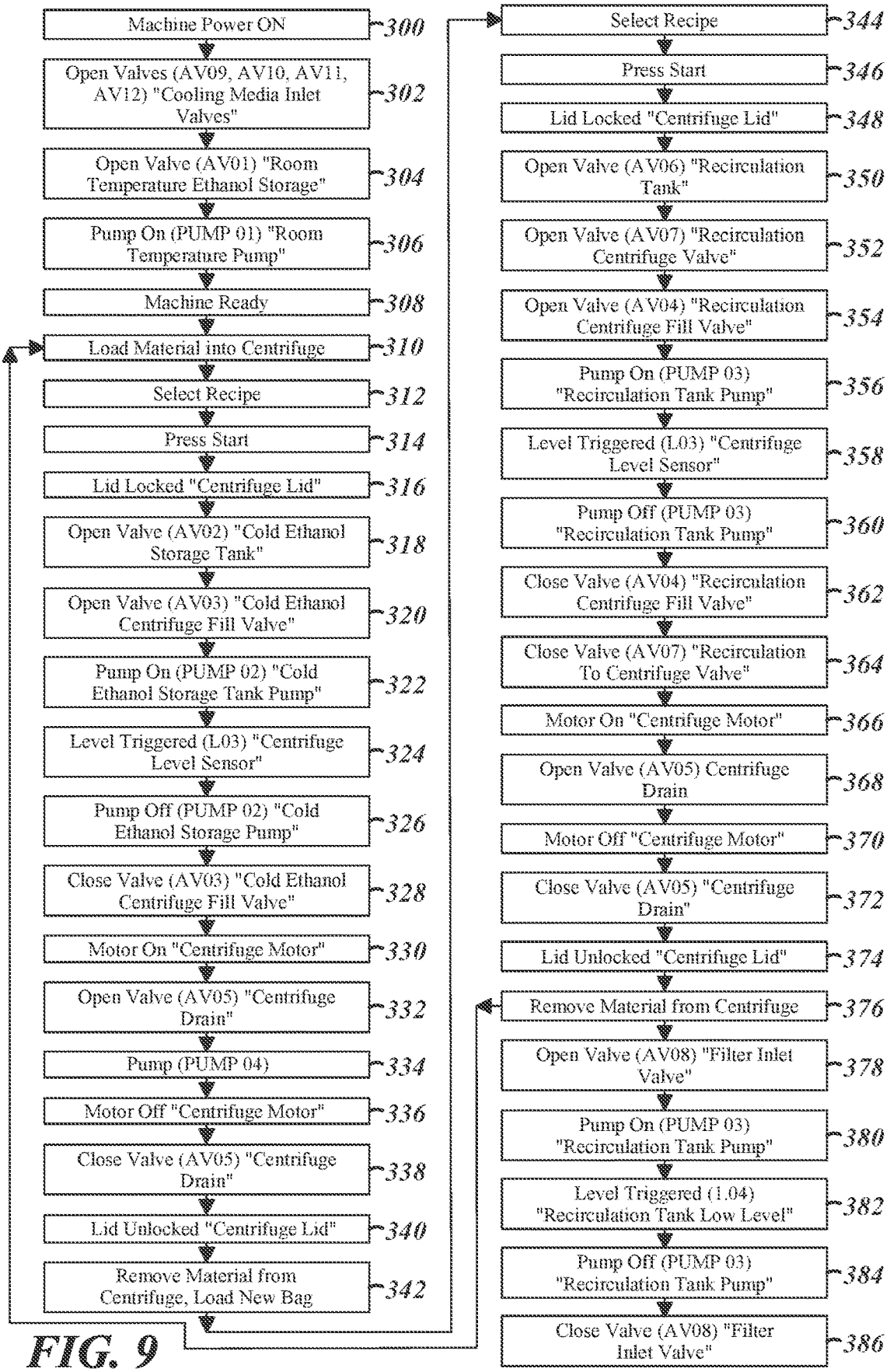
FIG. 9 is a diagram of steps the extraction apparatus may carry out in implementing a process of extracting plant oil from plant bearing material.

FIG. 9 illustrates some of the steps that may be performed automatically by the apparatus and under the control of its PLC 18 to extract plant oil from plant material. In Step 300, the electric power to the apparatus 10 and the chiller unit 76 is turned on and in Step 302 the PLC opens the coolant flow control valves 79, 83, 139 and 189 and with the signal from the temperature sensors 42, 90, 155 and 196 monitors the temperatures and controls the coolant flow to ensure that cold solvent in the cold storage vessel 26, centrifuge 92 and recirculation vessel 160 will cool and maintain the solvent therein at a temperature of −40° C. or lower. The PLC may also control the coolant flow control valves 79, 83, 108, 139 and 189 to do so. The PLC in Step 306 may also control the solvent refill pump 39 transferring solvent from any remote storage tank into the solvent holding tank 22 and with a signal from the level sensor 40 may determine and maintain sufficient solvent in the holding tank 22 for a complete operating cycle of the apparatus 10. If so, in Step 306 the PLC opens the outlet valve 46 and turns on the pump 44 to supply solvent to and through the heat exchanger 24 and sufficient cold solvent into the cold storage vessel 26 for carrying out at least one cycle of operation of the apparatus 10. The PLC may use the signal from the level sensor 88 to determine and control the level or quantity of cold solvent in the storage vessel 26. At Step 308, the PLC may determine whether the apparatus is ready to begin an automated oil extraction process and to do so may use at least in part signals from the level sensors 40, 88, 154 and 194 and signals from the temperature sensors 42, 90, 155 and 196 and if desired signal from the pressure sensors 230, 232 and 254.

If the apparatus is ready to perform an oil extraction process, the PLC may provide such an indication to the HMI 20 and at Step 310 the operator may load a batch of plant material into the centrifuge basket 112 and secure its cover 142, at Step 312 enter the data or recipe for the extraction process to be performed by the apparatus 10, and then at Step 314 press the start button or indicia on the HMI for the apparatus 10 to begin automatically carrying out an oil extraction process.

At Step 316, the PLC cycles the latch mechanism 152 to lock or prevent opening of the cover 142. To transfer cold solvent into the centrifuge container 124, the PLC, at Step 318 opens the outlet valve 100, at Step 320 opens the inlet valve 108, and at Step 322 energizes the transfer pump 94. To provide the desired quantity of solvent in the centrifuge container 124, the PLC may use an electronic signal from the level sensor 154 to monitor the rising level or quantity of solvent in the centrifuge container and when the desired level or quantity is reached, at Step 326 the PLC turns off the pump 94 and at Step 328 closes the solvent inlet valve 108 and the outlet valve 100.

The PLC at Step 330 energizes the centrifuge drive motor 92 to agitate the solvent in the centrifuge desirably by an alternating back-and-forth rotary motion of the basket 112 of the centrifuge for a predetermined period of time which may have been entered by the operator using the HMI. Thereafter, at Step 332, the PLC opens the centrifuge drain valve 163 and at Step 334 energizes the pump 161 to transfer an oil and solvent mixture out of the centrifuge and into the recirculation tank 160, and energizes the centrifuge motor 92 to desirably spin or rotate the basket in one direction for a predetermined period of time (which may have been entered by the operator through the HMI) to remove solvent and oil mixture from the plant material in the basket and thus to "dry" the plant material. Thereafter, the PLC at Step 336 turns off or deenergizes the centrifuge motor 92, at Step 338 closes the centrifuge drain valve 163, and at Step 340 cycles the latch mechanism 152 to unlock or release the centrifuge cover.

The operator at Step 342 removes the plant material from the centrifuge basket 112 and loads a new batch of plant material (which may be in a perforated bag) into the centrifuge basket. If it is desired to change any or all of the parameters for the process to extract oil from this new batch of plant material, at Step 344, the operator enters such data or recipe using the HMI. For the new batch of material, if it is desired to run the same process or recipe of that used for the batch as the immediately preceding batch of material, the operator may so instruct using the HMI, and then at Step 346 presses the start button or icon desirably on the HMI to begin another automated cycle of oil extraction from the new batch of plant material. At Step 348, the PLC cycles the latch mechanism 152 to latch or lock the cover of the centrifuge so that it cannot be opened while the centrifuge is operating.

To use the solvent and oil mixture in the recirculation vessel 160 for extracting oil from the new batch of plant material, the PLC in Step 350 opens the recirculation vessel outlet valve 174, at Step 352 opens the recirculation valve 180, at Step 354 opens the centrifuge recirculation inlet valve 182, and at Step 356 energizes the pump 168 to transfer the solvent and oil mixture from the recirculation vessel into the centrifuge 92. The PLC at Step 358 uses an electronic signal from the centrifuge level sensor 154 to monitor the rising level or quantity of the solvent and oil mixture transferred into the centrifuge container and when the desired level or quantity is reached, the PLC at Step 360 turns off the recirculation pump 168, at Step 362 closes the recirculation inlet valve 182 and at Step 364 closes the recirculation valve 180.

Thereafter, the PLC at Step 366 energizes and controls the centrifuge drive motor 92 to agitate the recirculated solvent and oil mixture in the centrifuge desirably by alternately rotating the basket 112 back-and-forth for a predetermined period of time (which may have been entered by the operator using the HMI). After the agitation is completed, the PLC in Step 368 opens the centrifuge drain valve 163 and operates the centrifuge motor 92 to spin or rotate the basket in one direction to remove solvent and oil mixture from the plant material and thereby "dry" it. After a predetermined period of time (which may have been entered by the operator using the HMI), the PLC at Step 370 turns off or deenergizes the centrifuge drive motor 92, at Step 372 closes the centrifuge drain valve 163, and at Step 374 cycles the latch mechanism to unlatch or unlock the centrifuge cover 142 so that it may be opened.

Thereafter, at Step 376 the operator may open the cover 142 and remove the batch of processed plant material from the centrifuge basket 112, load another batch of new plant material into the basket and close and secure the centrifuge cover. After the cover is closed, if desired, the operator may return to Step 312 to enter the data and recipe for processing this batch of new plant material and in Step 314, press the start icon on the HMI screen to cause the apparatus to start another automatic oil extraction process. If the data for the preceding batch of plant material is to be used again, the operator may so instruct by pressing the start icon on the HMI.

To filter the desirably twice cycled oil and solvent mixture, the PLC at Step 378 may open the filter inlet valve 198 and the recirculation vessel outlet valve 174 and at Step 380 energize the pump 168 to begin transferring the twice cycled solvent and oil mixture from the recirculation vessel and passing such mixture through the series of filters 200, 202 and 204. The PCL at Step 382 may use the electric signal from the recirculation vessel level sensor 194 to monitor the removal of the twice cycled oil and solvent mixture from the recirculation tank and when the desired level or quantity of such twice cycled solvent and oil mixture has been removed and transferred to the series of filters, the PLC at Step 384 turns off or deenergizes the recirculation pump 168 and at Step 386 closes the filter inlet valve 198.

While the apparatus 310 is automatically processing batches of plant material to extract oil from them, the PLC 18 may also use electric signals from the temperature sensors 42, 90, 196 and, if desired, a temperature sensor (not shown) operably associated with the centrifuge to control and cycle the coolant inlet valves 189, 83, 79 and 139 to maintain the temperature at each of the cold solvent storage vessel 26, centrifuge 92, recirculation tank 160 and the solvent produced by the heat exchanger 24 at a temperature of −40° C. or lower.

Persons of ordinary skill in the art will appreciate that the foregoing steps implemented and/or controlled by the PLC are not the only steps and/or sequence of steps for which the PLC 18 may be programmed and implemented by it to automatically perform a process of extraction of oil from a batch or batches of plant material, separation and recovery of the plant oil from a solvent and plant oil mixture, and/or recovery and reuse of solvent from a solvent and plant oil mixture. Persons of ordinary skill in the art will also appreciate the apparatus 10 may perform a process of extracting and recovering oil from plant material which does not use a solvent and oil mixture to extract oil from a new or fresh batch of plant material. They will also appreciate that a solvent and oil mixture may be recycled more than once to extract oil from more than one fresh batch of plant material.

The apparatus may be designed to process anywhere from about 300 pounds to more than 200,000 pounds of plant material per 24-hour day; particularly since it has a modular configuration. Typically, the centrifuge may be designed to process a batch of material in the range of about 10 to 500 pounds, and, if desired, multiple centrifuge modules may be used. For many commercial processing facilities or plants, the apparatus may be designed to process 1,000 to 30,000 pounds of plant material per 24-hour day.

Figure 11:
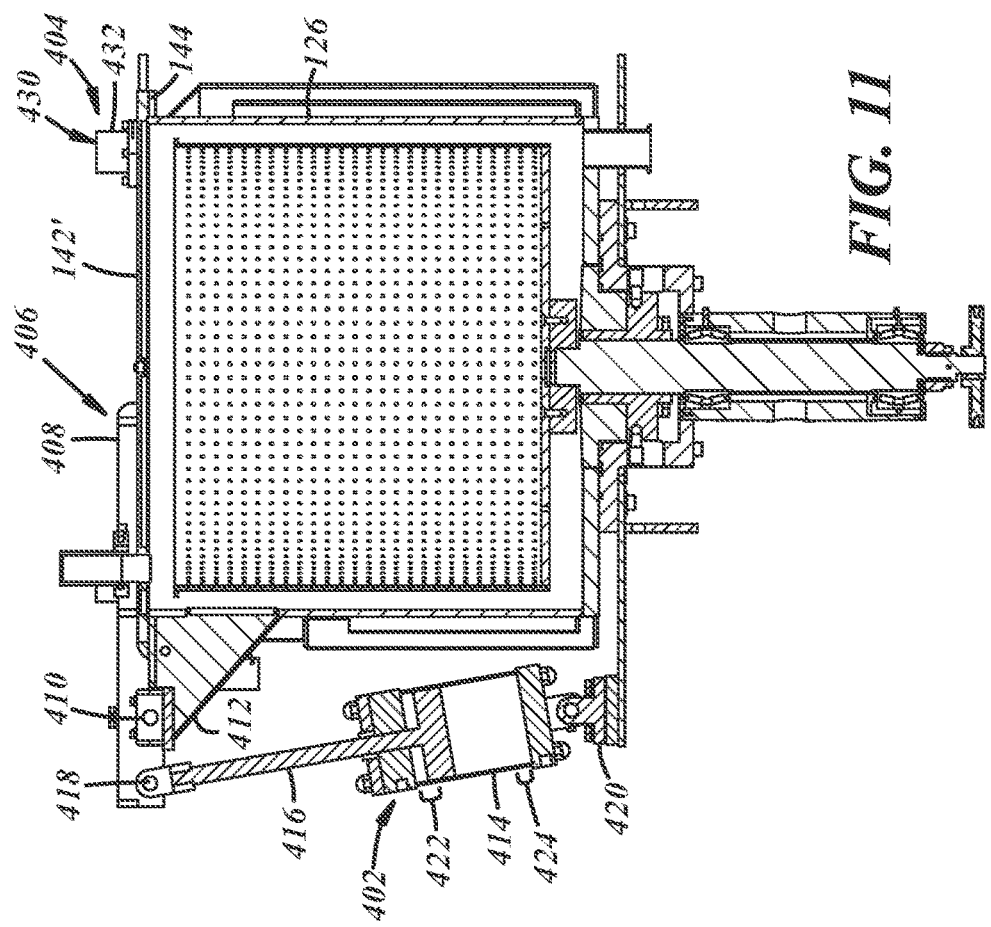
FIG. 11 is a sectional view taken generally on line 11-11 of FIG. 10.
Figure 10:
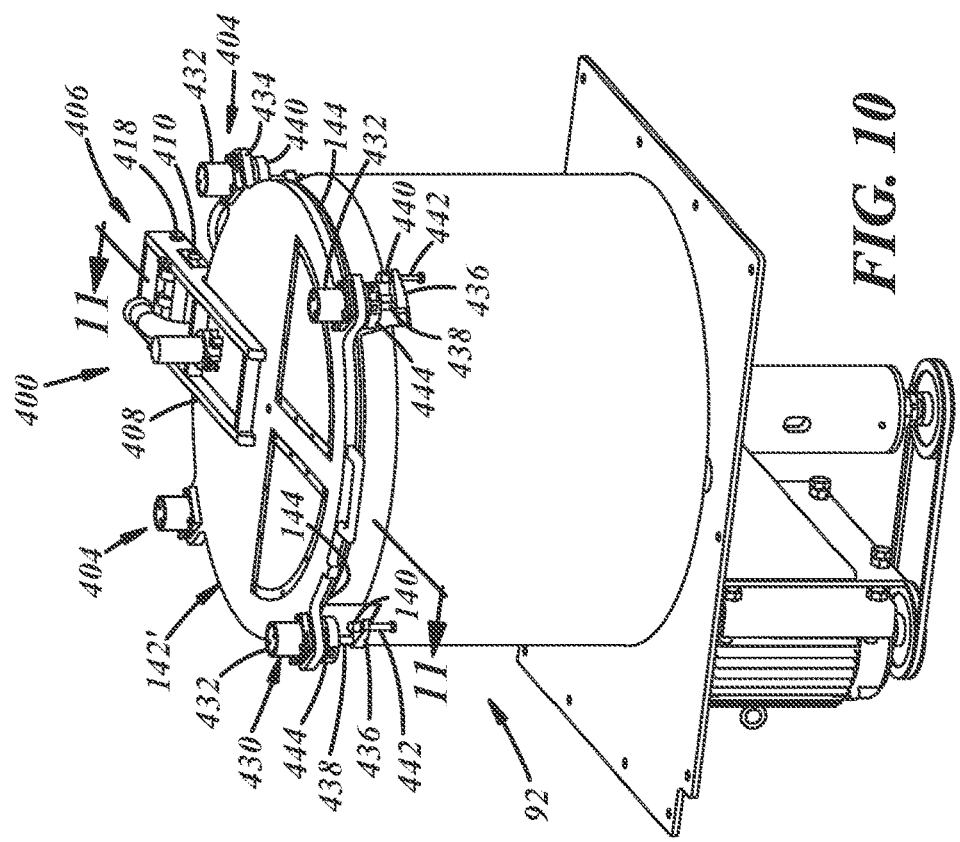
FIG. 10 is an isometric view of a centrifuge with mechanisms for automatically opening and closing a cover of the centrifuge and clamping and unclamping the closed cover of the centrifuge.

For some applications it may be desirable to use a centrifuge with a cover which may be automatically unclamped, opened, closed and clamped so that an operator does not need to manually do so. As shown in FIGS. 10 & 11 a centrifuge 92 may be provided with a mechanism 400 for doing so which may be controlled by the PLC 18. For opening and closing a cover 142' this mechanism may include an actuator assembly 402 and for unclamping and clamping the closed cover a plurality of clamp assemblies 404.

So that the cover 142' may be pivotally moved from its closed position to its fully open position (which may be somewhat more than 90 degrees from its closed position) the cover may be attached to the centrifuge by a hinge assembly 406. This hinge assembly may include a pair of laterally spaced apart arms 408 fixed to and extending longitudinally outward of the cover and pivotally connected by a hinge pin 410 to a support bracket 412 fixed to the centrifuge sidewall 126. The actuator assembly 402 may include a hydraulic or desirably pneumatic cylinder 414 with a piston rod 416 pivotally connected to the hinge assembly by a pin 418 carried by the arms 408 outboard of the hinge pin 410. Adjacent the other end the cylinder may be pivotally attached to a plate of the frame 130 by a bracket 420. A pilot valve may be associated with the cylinder for cycling it and if pressure is lost when the cover 142' is open it may prevent it from closing or slamming shut. The cylinder may include or have associated sensors 422 and 424 such as proximity switches which may provide to the PLC 18 signals indicating the cover 142' is respectively fully open and fully closed. A suitable pneumatic cylinder is commercially available from BIMBA, 14425 23$^{rd}$ Avenue North, Plymouth, Minn. 55447 and suitable sensor switches are commercially available from Neff Engineering, 5375 Hill 23 Drive, Flint, Mich. 48507 such as model number RS004-7HL.

As shown in FIG. 10, the clamp assembly 404 may include a plurality such as four hydraulically or desirably pneumatically actuated clamps 430 which may be equally circumferentially spaced around the periphery of the cover 142' and each with a body 432 attached to a tab 434 of the cover. Each clamp may have an arm 436 fixed to a spindle 438 connected to a piston in its body and configured to retract and extend the arm and to rotate the arm about 90 degrees counterclockwise as the arm approaches its fully extended position shown in FIG. 10 and clockwise about 90 degrees as it moves the arm to its retracted position. A pad 440 on an end of a pin 442 carried by the arm 436 is configured to bear on the flange 144 of the centrifuge 92 when the cover is closed and the clamp spindle is rotated clockwise and retracted to thereby firmly clamp the closed cover on the centrifuge. To permit adjustment of the axial position of the pad relative to the arm the pin 442 may be threaded through the arm. To provide signals to the PLC 18 of the fully open and closed states of each clamp assembly, a separate sensor 444 may be operably associated with each clamp. A suitable non-contact sensor is commercially available from Banner Engineering, 4230 creek View Drive, Hudsonville, Mich. 49426 such as model number MIAD9W. Suitable pneumatic actuated clamp assemblies are commercially available from Destaco, 691 North Squirrel Road Suite 250, Auburn Hills, Mich. 48326 such as model number 8215.

For an operator to start the automatic opening or closing of the centrifuge cover 142', two separate switches 446 & 448 such as push button safety switches may be mounted on opposite sides of the HMI interface 20 or any other convenient location and desirably spaced apart far enough that the operator must use both hands (a separate hand for each switch) to push and briefly simultaneously hold both buttons to actuate both switches (change their state) to thereby send a signal to the PLC controller 18 to begin the steps needed to control the unclamping and opening or closing and clamping of the cover. To do so, at least some of the steps that may be initiated and controlled by the PLC are listed in FIG. 12.

Figure 12:
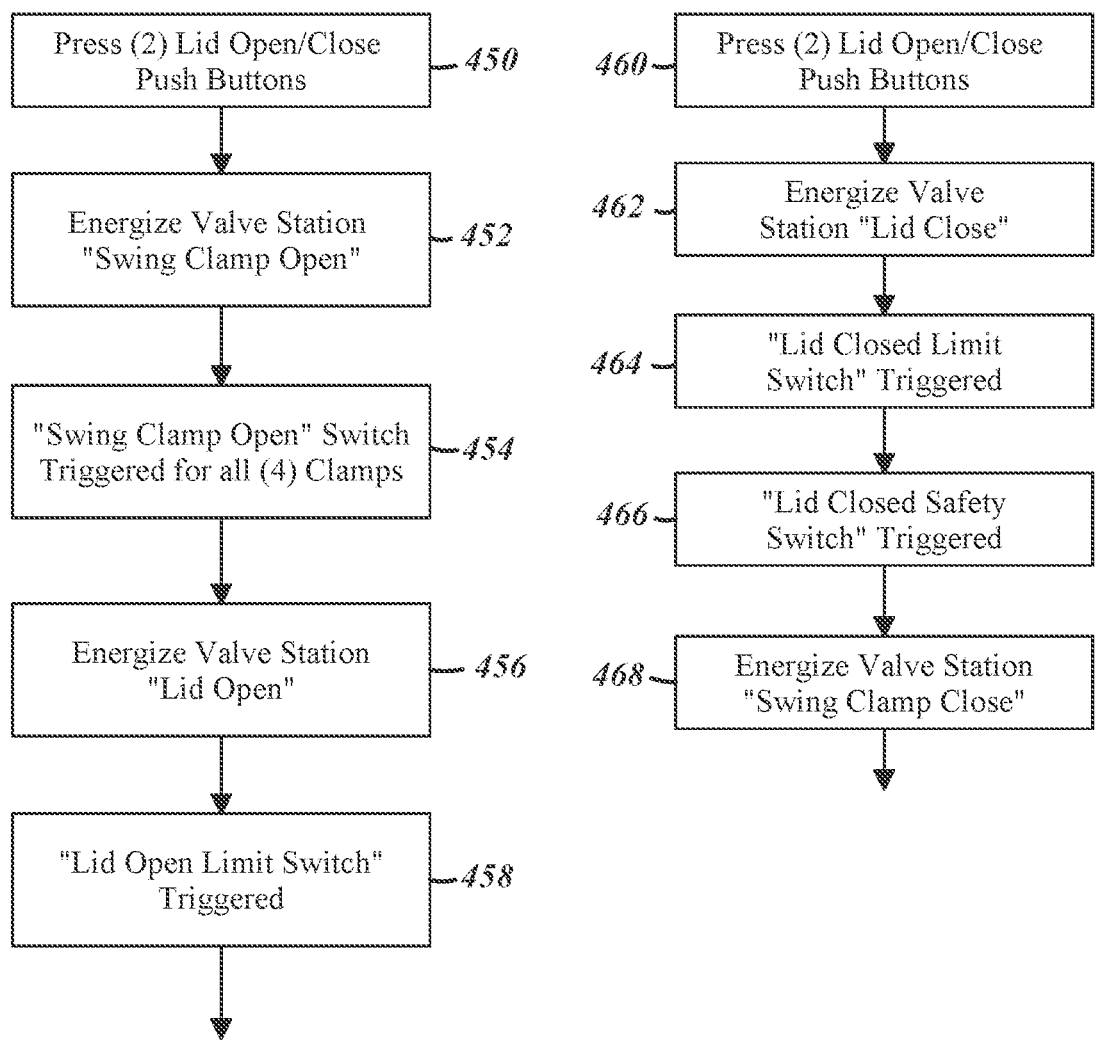
FIG. 12 is a diagram of steps the cover mechanism may carry out in unclamping, opening, closing and clamping the cover of the centrifuge of FIG. 10.

If the centrifuge cover 142' is fully closed and clamped, to automatically unclamp and open it, as shown in FIG. 12, at step 450 the operator presses and holds with both hands the switches 446 & 448 to send a signal to the PLC 18 which at step 452 may actuate all of the clamps 430 to their fully open position such as by energizing a solenoid actuated flow control valve to supply a pressurized fluid such as compressed air to a port of each clamp cylinder to extend the clamp spindle 438 and rotate the arm 436 counterclockwise to the open position shown in FIG. 10. At step 454 the PLC may use signals from the clamp position sensors 444 to determine if the clamps are fully open. If not, the PLC will not permit the cover opening steps to proceed further until the clamps are fully open and may send an error display signal to the HMI interface 20 to indicate to the operator that the clamps are not fully open. If the sensors 444 indicate that all the clamps are fully open, the PLC may proceed to step 456 to open the cover 142' such as by energizing a solenoid actuated flow control valve to supply a pressurized fluid such as compressed air to a port of the cylinder 414 to retract its piston rod 416 and thereby move the cover toward its fully open position. At step 458 the PLC may use a signal from the cylinder sensor 424 to determine if the cover is fully open and if so, may end the cover opening routine, and if not may send to the HMI interface 20 an error display signal indicating to the operator that the cover is not fully open. If desired the PLC may also inhibit further operation of the extraction apparatus and system 10 until the cover is fully open.

If the centrifuge cover 142' is fully open, to automatically close and clamp it, the operator at step 460 presses and holds with both hands the switches 446 & 448 to send a signal to the PLC 18 which at step 462 may energize a solenoid flow control valve to supply a pressurized fluid such as compressed air to a port of the cylinder 414 to extend its piston rod 416 to close the cover. Only when the cover becomes fully closed at step 464 will the cylinder sensor 422 send a signal to the PLC 18 which optionally may then proceed to step 466 to use a signal from the lid closed safety switch 152 to redundantly confirm that the cover is fully closed and if not may inhibit operation of the centrifuge and may send an error display signal to the HMI 20 to indicate to the operator that the cover is not fully closed. If the cover is fully closed, the PLC may proceed to step 468 to close all of the clamps 430 such as by energizing a solenoid flow control valve to supply a pressurized fluid such as compressed air to a port of the clamps to thereby rotate their arms 436 clockwise and retract their spindles 438 to securely clamp the closed centrifuge cover. If desired the PLC may also use signals from the clamp sensors 444 to confirm that they have all moved to their closed position.

Figure 15:
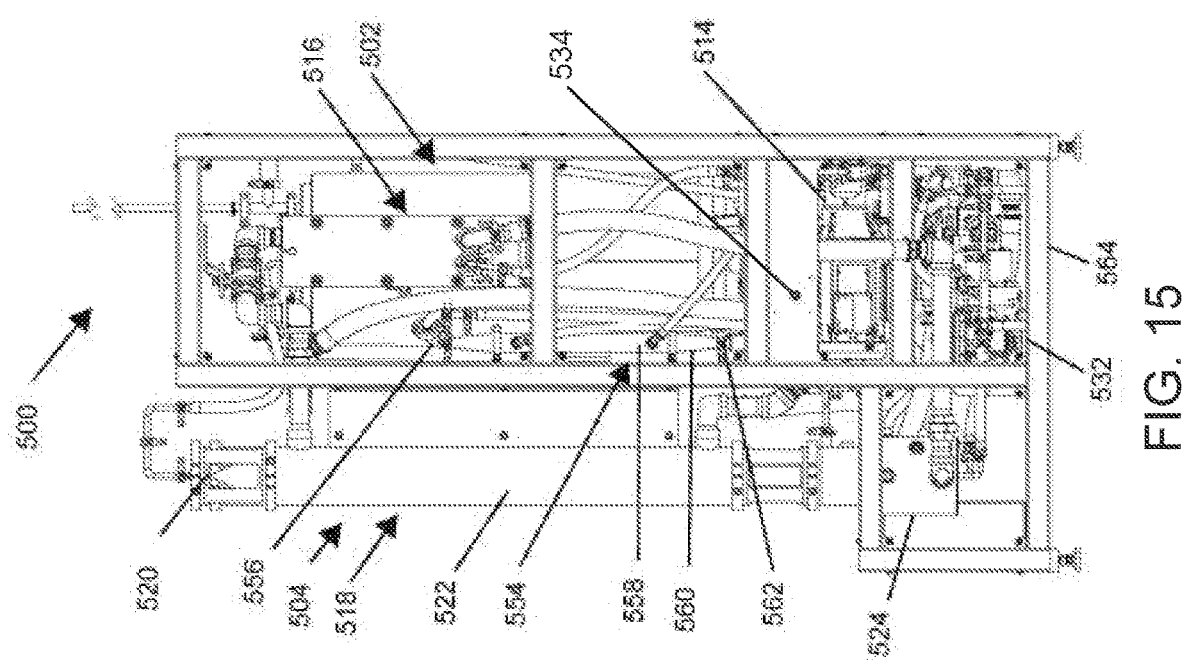
FIG. 15 is a right-hand side view of the solvent recovery apparatus of FIG. 13 with its outer cover panels removed.

FIGS. 13-15 show a suitable apparatus 500 for separation and recovery of the solvent of the solvent and plant oil mixture. The apparatus 500 may be either a stand-alone unit or another module of the system 10 and receive a filtered plant oil and solvent mixture from the filter module 16. The separation apparatus may include a mixture buffer tank 502, a solvent evaporator assembly 504 and a solvent condenser assembly 506. The buffer tank may include an inlet 508 connected by a conduit to a coupling 510 for receiving a solvent and oil mixture which preferably has been filtered and an outlet 512 communicating through suitable conduits with a pump 514 which may supply the mixture to the evaporator assembly 504 desirably through a heat exchanger 516 which preheats the mixture closer too the evaporation temperature of its solvent in a vacuum typically in the range of 5 to 28 inches of mercury to a temperature in the range of 140° to 190° F.

The evaporator assembly 504 may include a tube and shell evaporator 518 with a spray head 520 receiving preheated mixture from the heat exchanger 516 and discharging it in a spray into the interior of the upper ends of a plurality of small diameter vertically oriented tubes in the shell 522 of the evaporator. A heated fluid such as hot water typically at a temperature in the range of 140 to 190 degrees F. is circulated through the shell to heat the tubes and thus the mixture therein to a high enough temperature to vaporize at least most of the solvent in the mixture which vaporized solvent and plant oil flow downwardly through the small diameter tubes and through their outlets into a chamber 524 in the bottom portion of which the liquid plant oil accumulates and above it the vaporized solvent flows through an outlet 526 and a connecting conduit 528 to the condenser assembly 502. The flow of the mixture and vaporized solvent downwardly through the small diameter tubes into the collection chamber is facilitated by a vacuum applied to the condenser assembly and thus at least indirectly through the conduit to the collection chamber and the outlet bottom ends of the tubes of the evaporator 518. The separated plant oil flows from an outlet 530 in the bottom of the chamber to an inlet of a pump 532 which discharges the separated plant oil through a conduit to an outlet coupling 534 of the apparatus 500.

The condenser assembly 506 may have both a primary condenser and a secondary condenser. The primary condenser may be a tube and shell condenser 536 with a plurality of small diameter tubes disposed vertically within an outer shell 538 with an inlet 540 connected by suitable conduits to a supply coupling 542 and an outlet 544 through which a fluid such cold water or a cold water and antifreeze mixture at a temperature in the range of about 30 to 50 degrees F. is circulated to cool the tubes to a low enough temperature to condense the vaporized solvent to a liquid form. The vaporized solvent may enter the upper open ends of the small tubes, be condensed therein to liquid solvent which may flow from the bottom open ends of the tubes into a container 546 with an outlet 548 connected to an inlet of a pump 550 which discharges the liquid solvent to an outlet connector 552. The outlet connector 552 may be connected to a solvent storage tank such as the tank 22 of the system 10. Vaporized solvent received in the container 546 may also flow through a suitable conduit into a secondary condenser which may also be a tube and shell condenser 554 with a solvent vapor inlet 556 communicating with the open upper ends of small diameter tubes disposed vertically within an outer shell 558 and with a container 560 for receiving liquid solvent communicating with the bottom open ends of the tubes. An outlet 562 in the bottom of the container 560 communicates with the inlet of the pump 550. A cooling fluid such as cold water is also circulated through the shell 558 of this secondary condenser to cool its tubes and condense solvent vapor in them to a liquid solvent. A vacuum typically in the range of about 5 to 28 inches of mercury is desirably applied to the bottom ends and interior of the small diameter tubes of the secondary condenser 554 to facilitate flow of the vaporized solvent from the evaporator 518 to and into the tubes of both condensers 536 & 554 and condensed liquid solvent into the containers 546 & 560 and thus to the pump 550. This vacuum may be provided by a source such a vacuum pump operably connected to a vacuum inlet 562 of the apparatus 500. Various component parts of the apparatus 500 may be carried by and mounted on a frame 564 which may be made of steel tubing and enclosed by covers or panels desirably removably attached to the frame.

In use of the separator and solvent recovery apparatus 500, a vacuum may be applied to the evaporator 518 and the condensers 536 & 554, the heat exchanger energized to preheat a liquid solvent and plant oil mixture to a temperature desirably close to but below the vaporization temperature of its solvent, and the pumps 514, 532 & 550 energized. The energized pump 514 will transfer a liquid solvent and plant oil mixture from the buffer tank 502 to and through the heat exchanger 516 to preheat the mixture and into the evaporator 518 to vaporize the solvent and separate it from the liquid plant oil. The pump 532 will transfer the separated liquid solvent from the evaporator assembly 504 to an outlet connector 534 typically for further processing. The vaporized solvent will flow to the condensers 536 and 554 where it will be sufficiently cooled to condense to a liquid form and this liquid solvent will be transferred from the condensers to an outlet connector 554 which may be connected to a holding tank of liquid solvent.

If desired, after removal of solvent from the mixture, the separated plant oil may be decarboxylated such as by a decarboxylation apparatus 580 which may be a stand-alone unit or a module of the system 10 which may receive separated plant oil from it or from the apparatus 500 or from another source. As shown in FIGS. 16-18, the decarboxylation apparatus 580 may have a solvent purge condenser 582 and a plant oil reactor assembly 584. To purge the plant oil of any remaining volatile solvent, it may be heated in the reactor assembly 584 under a vacuum of 10 to 29 inches of mercury to a solvent vaporization temperature typically of about 60 to 100 degrees C. for a period of time typically of about 20 to 120 minutes. The vaporized solvent may be condensed to a liquid solvent in the condenser assembly 582. After the solvent purge is completed the purged plant oil may be decarboxylated by heating it in the reactor assembly under a vacuum of about 10 to 29 inches of mercury to a temperature typically of about 100 to 150 degrees C. (212 to 302 degrees F.) usually for at least 20 minutes and typically about 30 to 240 minutes. The reactor assembly and the condenser assembly may be carried by and attached to a frame 586 which may be a weldment of steel tubes.

Figure 19:
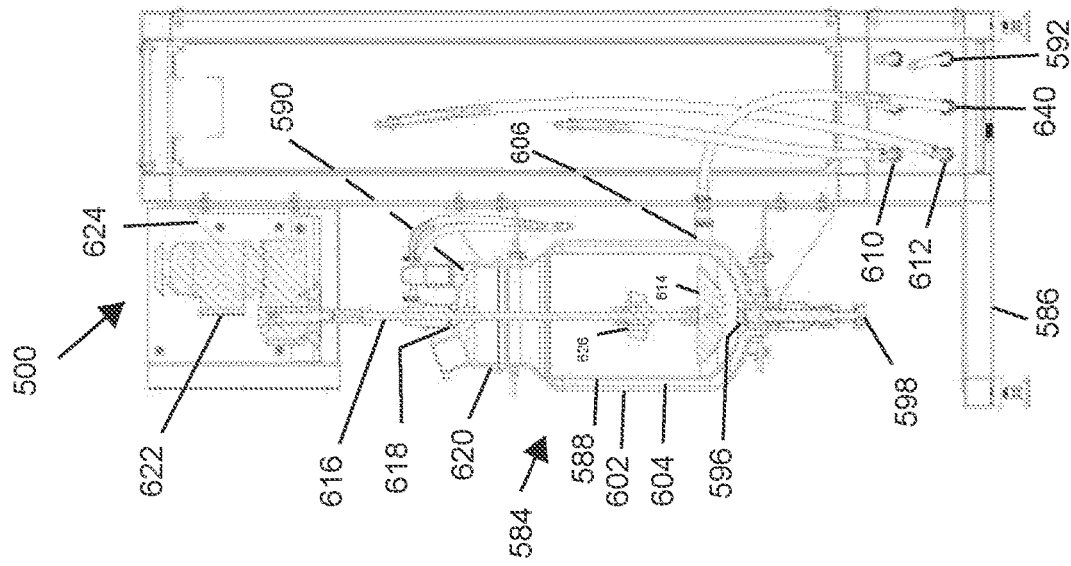
FIG. 19 is a sectional view of the decarboxylation apparatus taken generally on line 19-19 of FIG. 16.

As shown in FIG. 19, the reactor assembly 584 may have a vessel 588 with an inlet 590 connected by a conduit to a coupling 592 attached to a 594 panel for supplying plant oil to the reactor vessel and an outlet 596 with a normally closed manual valve 598 which may be opened to remove decarboxylated plant oil from the reactor vessel. The vessel 588 may also have an outlet 600 for removing vaporized solvent from the vessel. For heating the vessel its side wall and desirably bottom wall may be surrounded by a jacket 602 to provide a chamber 604 with an inlet 606 and an outlet 608 (FIG. 18) through which a thermally conductive heating fluid such as a silicone oil may be supplied and circulated. The inlet 606 may be connected by a conduit to a coupling 610 carried by the panel and the outlet 608 may be connected by a conduit to a coupling 612 carried by the panel. The heating fluid may be supplied by a heater and a pump which may be external to the decarboxylator apparatus 580. The pump may be connected to the inlet 606 through the coupling 610 the outlet 608 may be connected to the heater by the coupling 612 for returning the fluid from the chamber 604 so that in use the heating fluid may be recirculated through the chamber 604 desirably in a closed loop. A suitable silicon oil is Huber SilOil part number M20.195/ 235.20. If desired the exterior of the jacket 602 may be provided with thermal insulation.

To promote more uniform heating of plant oil in the reactor vessel 588, as shown in FIG. 19, it may be stirred or agitated by an impeller 614 with a plurality of blades such as four blades which may be disposed in the vessel 588 adjacent its bottom and attached to a shaft 616 extending through a bearing and seal 618 in the top or cover 620 of the vessel and connected to a motor 622 for rotating the blade and shaft. The motor may be attached to brackets 624 secured to the frame 586. In one non-limiting example, the impeller may have four blades inclined about 60 degrees to its axis of rotation and a diameter of 6 to 10 and desirably 8 inches and in use be rotated by the motor at a speed of about 60 to 250 RPM. If desired, another impeller 626 may also be attached to the shaft for rotation therewith and spaced above the impeller 614 to about 30% to 70% and desirably 50% of the vertical extent or depth of plant oil normally received in the vessel for purging and decarboxylation.

As shown in FIG. 18, the condenser assembly 582 may have a tube and shell condenser 630 with a plurality of small diameter tubes received and vertically disposed in an outer shell 632. The outer shell may have a cooling fluid inlet 634 (FIG. 17) connected by a conduit to a coupling 636 carried by the panel for in use supplying a thermally conductive coolant fluid to the shell to cool the tubes therein sufficiently to condense to a liquid any vapor solvent therein and an outlet 638 connected by a conduit to a coupling 640 carried by the panel to return the cooling fluid from the shell. The inlet and outlet couplings 636 & 640 may be connected to an external chiller to circulate a cooling fluid through the shell such as cold water or a cold water and antifreeze mixture typically supplied to the shell at a temperature in the range of 30 to 50 degrees F. The bottom open ends of the tubes communicate through a port 642 (FIG. 18) and a conduit, with the vaporized solvent outlet 600 (FIGS. 16 & 17) of the reactor vessel 588. The upper open ends of the tubes communicate with a port 644 connected by a conduit with a connector 646 carried by the panel for communication with a vacuum source such as an external vacuum pump which in use applies a vacuum to the interior of the tubes to produce a flow of vaporized solvent from the reactor vessel outlet 600 into the tubes through their open bottom ends and in the tubes such vaporized solvent condenses to a liquid solvent which by gravity runs down the inside of the tubes and out of their bottom ends into a container 648. An outlet 65 in the bottom of the container is connected to a normally closed manual valve 652 which when opened allows liquid solvent to be removed or drained from the container.

In use of the decarboxylation apparatus 580, a vacuum source such as a vacuum pump is connected to the coupling 646 to supply a vacuum which is typically about 10 to 29 inches of mercury, a coolant fluid source such as a chiller is connected to the couplings 636 and 640 to circulate a cooling fluid such as cold water or a cold water and antifreeze mixture at a temperature of about 30 to 50 degrees F. through the shell 632 of the condenser 630, a heater with a pump is connected to the couplings 610 and 61 to circulate a heating fluid such as a thermally conductive oil through the chamber 604 of the reactor to heat plant oil therein, and a source of liquid plant oil is connected to the coupling 592 to supply a desired quantity of plant oil to be decarboxylated to the reactor vessel 588. In use, the desired quantity or batch of such plant oil is supplied to the reactor vessel and to purge or remove any remaining volatile solvent in the oil batch is heated in the vessel under a vacuum to a temperature of about 60 to 100 degrees C. for a period of time of about 20 to 120 minutes depending on the specific plant oil and the quantity of any solvent therein and preferably while being stirred or agitated by the impeller 614 or impellers 614 and 626 being rotated by the motor 622. The purged vaporized solvent may be transferred to the condenser 630 by the applied vacuum and condensed therein to a liquid solvent which accumulates in the container 648 from which it may be periodically drained by opening the normally closed valve when the decarboxylation apparatus is not operating and the vacuum is turned off and relieved. After the solvent purge is completed the plant oil in the reactor vessel 588 may be decarboxylated by heating it under the vacuum to a temperature typically in the range of 100 to 150 degrees C. for a period of time of about 30 to 240 minutes depending on the specific plant oil and the extent it is desired to decarboxylate it and while it is being stirred or agitated by the impeller 614 or impellers 614 and 626 being rotated by the motor 622 typically at a speed in the range of 50 to 250 RPM. After decarboxylation of a batch of plant oil is completed, typically the vacuum is shut off and relieved and the normally closed valve 598 opened to drain the batch of decarboxylated oil from the reactor vessel. Thereafter, this valve may be closed, another batch of plant oil to be decarboxylated supplied to the reactor vessel 588, the vacuum reapplied, and the process and cycle of apparatus 580 repeated to purge and decarboxylate it.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A plant oil extraction apparatus comprising:
   a heat exchanger configured to cool an alcohol solvent to provide a cold solvent with a temperature of −40° C. or lower;
   a centrifuge configured to receive a batch of plant material containing plant oil and contact the plant material with the cold solvent while maintaining the cold solvent at a temperature of substantially −40° C. or lower and extract oil from the plant material to provide a solvent and oil mixture;
   a programmable logic controller configured in operation to monitor and control the temperature of the cold solvent produced by the heat exchanger, control the centrifuge to agitate the solvent in contact with the plant material for a period of time, and to rotate for a period of time to separate the mixture from the plant material;
   a holding tank configured to receive a quantity of alcohol solvent and a pump configured to supply alcohol solvent from the tank to the heat exchanger and operation of the pump is controlled by the programmable logic controller; and
   a temperature sensor operatively associated with the holding tank and providing a signal to the programmable logic controller which is at least one signal used by the programmable logic controller to control the rate of flow at which the pump supplies alcohol solvent from the holding tank to the heat exchanger.

2. The apparatus of claim 1 which also comprises at least one filter configured to filter the solvent and oil mixture.

3. The apparatus of claim 1 which also comprises:
   a remote solvent storage tank having a maximum capacity greater than the maximum capacity of the holding tank and a pump configured to supply solvent from the remote storage tank to the holding tank;
   a solvent level sensor operatively associated with the holding tank and configured to provide a signal to the programmable logic controller of the level of solvent in the holding tank, and the programmable logic controller controlling operation of the pump to supply solvent to the holding tank.

4. A plant oil extraction apparatus comprising:
   a heat exchanger configured to cool an alcohol solvent to provide a cold solvent with a temperature of −40° C. or lower;
   a centrifuge configured to receive a batch of plant material containing plant oil and contact the plant material with the cold solvent while maintaining the cold solvent at a temperature of substantially −40° C. or lower and extract oil from the plant material to provide a solvent and oil mixture;
   a programmable logic controller configured in operation to monitor and control the temperature of the cold solvent produced by the heat exchanger, control the centrifuge to agitate the solvent in contact with the plant material for a period of time, and to rotate for a period of time to separate the mixture from the plant material; and
   a cold storage vessel configured to receive the cold solvent from the heat exchanger and to maintain the cold solvent therein at a temperature of −40° C. or lower.

5. The apparatus of claim 4 which also comprises a temperature sensor operatively associated with the cold storage vessel and providing a signal to the programmable logic controller which is used at least in part by it in maintaining the cold solvent therein at a temperature not greater than −40° C.

6. The apparatus of claim 4 which also comprises a cooling jacket on at least part of a side wall of the cold storage vessel and configured to maintain the temperature of a cold solvent therein at a temperature not greater than −40° C.

7. The apparatus of claim 4 which also comprises a pump configured to supply cold solvent from the cold storage vessel to the centrifuge and operation of the pump is controlled by the programmable logic controller.

8. The apparatus of claim 1 which also comprises a cooling jacket configured to maintain cold solvent in the centrifuge at a temperature not greater than −40° C.

9. A plant oil extraction apparatus comprising:
a heat exchanger configured to cool an alcohol solvent to provide a cold solvent with a temperature of −40° C. or lower;
a centrifuge configured to receive a batch of plant material containing plant oil and contact the plant material with the cold solvent while maintaining the cold solvent at a temperature of substantially −40° C. or lower and extract oil from the plant material to provide a solvent and oil mixture;
a programmable logic controller configured in operation to monitor and control the temperature of the cold solvent produced by the heat exchanger, control the centrifuge to agitate the solvent in contact with the plant material for a period of time, and to rotate for a period of time to separate the mixture from the plant material; and
a recirculation vessel having a plant oil and solvent mixture inlet communicating with an outlet of the centrifuge and an outlet for the oil and solvent mixture communicating with an inlet of the centrifuge, and the recirculation vessel configured to receive from the centrifuge an oil and solvent mixture removed from a first batch of plant material and to return this oil and solvent mixture to the centrifuge for removing oil from a new second batch of plant material.

10. The apparatus of claim 9 which also comprises a flow control valve in the connection between the outlet of the recirculation vessel and the inlet of the centrifuge with the flow control valve controlled by the programmable logic controller to control a flow of the solvent and oil mixture from the recirculation vessel into the centrifuge.

11. The apparatus of claim 9 which also comprises a cooling jacket on at least part of the recirculation vessel and configured to maintain a cold solvent and oil mixture in this vessel at a temperature not greater than −40° C.

12. The apparatus of claim 1 which also comprises a mechanism configured for automatically clamping and unclamping a closed cover of the centrifuge.

13. The apparatus of claim 1 which also comprises a mechanism configured for automatically opening and closing a cover of the centrifuge and clamping and unclamping the closed cover.

14. A plant oil extraction apparatus comprising:
a heat exchanger configured to cool an alcohol solvent to provide a cold solvent with a temperature of −40° C. or lower;
a centrifuge configured to receive a batch of plant material containing plant oil and contact the plant material with the cold solvent while maintaining the cold solvent at a temperature of substantially −40° C. or lower and extract oil from the plant material to provide a solvent and oil mixture;
a programmable logic controller configured in operation to monitor and control the temperature of the cold solvent produced by the heat exchanger, control the centrifuge to agitate the solvent in contact with the plant material for a period of time, and to rotate for a period of time to separate the mixture from the plant material; and
an evaporator configured to heat the alcohol and plant oil mixture to a temperature sufficient to vaporize at least part of the alcohol to a gas and a condenser configured to condense at least part of the gas alcohol to a liquid alcohol.

15. The apparatus of claim 14 wherein the evaporator is configured to heat the mixture in a partial vacuum and the condenser is configured to condense the gas alcohol in a partial vacuum.

16. The apparatus of claim 14 which also comprises a container configured to receive from the evaporator plant oil from which at least part of the alcohol has been vaporized and to supply vaporized alcohol to the condenser.

17. The apparatus of claim 14 which also comprises a container configured to receive liquid alcohol and any gas alcohol from the condenser and to supply any such gas alcohol to another condenser.

18. A plant oil extraction apparatus comprising:
a heat exchanger configured to cool an alcohol solvent to provide a cold solvent with a temperature of −40° C. or lower;
a centrifuge configured to receive a batch of plant material containing plant oil and contact the plant material with the cold solvent while maintaining the cold solvent at a temperature of substantially −40° C. or lower and extract oil from the plant material to provide a solvent and oil mixture;
a programmable logic controller configured in operation to monitor and control the temperature of the cold solvent produced by the heat exchanger, control the centrifuge to agitate the solvent in contact with the plant material for a period of time, and to rotate for a period of time to separate the mixture from the plant material; and
a reactor configured to receive plant oil from which at least some alcohol has been separated and to heat such plant oil to a temperature sufficient to decarboxylate it.

19. The apparatus of claim 18 which also comprises at least one impeller in the reactor configured for rotation to stir or agitate such plant oil in the reactor.

20. The apparatus of claim 17 which also comprises a condenser configured to receive from the reactor any gas alcohol and to condense it to a liquid alcohol solvent.

21. A plant oil extraction process comprising:
cooling a solvent to provide a cold solvent at a temperature of −40° C. or lower;
contacting plant material containing plant oil with the cold solvent to extract plant oil to provide a solvent and plant oil mixture;
heating the mixture to convert the solvent to a gaseous state to thereby separate the solvent from the plant oil;
cooling the separated gaseous solvent to a liquid to recover the solvent; and
contacting the solvent and plant oil mixture at a temperature of −40° C. or lower with another batch of plant material to increase the quantity of plant oil in the mixture before the step of heating the mixture to convert the solvent to a gaseous state.

22. The process of claim 21 which also comprises heating the separated plant oil to a temperature of 100° to 150° C. for at least 20 minutes to decarboxylate it.

23. The process of claim 21 wherein the mixture is heated in a partial vacuum.

24. A plant oil extraction centrifuge comprising:
a container with a circumferentially continuous side wall, an opening adjacent one end of the container and an end wall generally axially spaced from the one end of the container;
a cooling jacket at least in part surrounding at least part of the container side wall;

a basket with a circumferentially continuous and perforate side wall disposed inside the container and configured for rotation relative to the container;
a cover carried by the container and configured to be movable between a first closed position closing the opening of the container and a second open position opening the opening of the container;
at least one clamp movable to a first position to clamp the cover to the container when the cover is in its first position and to a second position to unclamp the cover so that it can be moved to its second position; and
an actuator mechanism configured to move the clamp to its first and second positions.

\* \* \* \* \*